US010582565B2

United States Patent
Yang et al.

(10) Patent No.: US 10,582,565 B2
(45) Date of Patent: *Mar. 3, 2020

(54) REGISTRATION METHOD, SESSION ESTABLISHMENT METHOD, TERMINAL, AND AMF ENTITY

(71) Applicant: HUAWEI TECHNOLOGIES CO., LTD., Shenzhen, Guangdong (CN)

(72) Inventors: Haorui Yang, Shenzhen (CN); Hui Jin, Beijing (CN); Guowei Ouyang, Beijing (CN); Yue He, Beijing (CN); Fenghui Dou, Beijing (CN); Xiaojuan Li, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 16/267,045

(22) Filed: Feb. 4, 2019

(65) Prior Publication Data

US 2019/0174405 A1     Jun. 6, 2019

Related U.S. Application Data

(63) Continuation of application No. 16/314,180, filed as application No. PCT/CN2017/089016 on Jun. 19, 2017.

(51) Int. Cl.
*H04W 4/00*     (2018.01)
*H04W 80/10*    (2009.01)
(Continued)

(52) U.S. Cl.
CPC .......... *H04W 80/10* (2013.01); *H04L 41/042* (2013.01); *H04L 41/0896* (2013.01);
(Continued)

(58) Field of Classification Search
None
See application file for complete search history.

(56) References Cited

U.S. PATENT DOCUMENTS

2012/0324541 A1   12/2012   Palacios Valverde
2014/0138707 A1    5/2014   Miki et al.
(Continued)

FOREIGN PATENT DOCUMENTS

CN   102884760 A   1/2013
CN   103650137 A   3/2014
(Continued)

OTHER PUBLICATIONS

LG Electronics, "Interim agreements on the network slice re-selection," XP051185034, S2-166474 (revision of S2-165615), SA WG2 Meeting #118, Nov. 14-18, 2016, 9 pages.
(Continued)

*Primary Examiner* — Elisabeth Benoit Magloire
(74) *Attorney, Agent, or Firm* — Conley Rose, P.C.

(57) ABSTRACT

A registration method, a session establishment method, a terminal, and an access and mobility management function (AMF) entity, where the method includes sending, by a terminal, a first message to the AMF entity, where the first message includes first information, first network slice selection information, and second network slice selection information, the first information includes information for requesting to establish a protocol data unit (PDU) session, the first network slice selection information is used by the AMF entity to select a first session management control function (SMF) entity, and the second network slice selection information is used by the AMF entity to select a second SMF entity, and receiving, by the terminal, a second message from the AMF entity, where the second message
(Continued)

includes second information, and the second information includes PDU session establishment accept information.

20 Claims, 14 Drawing Sheets

(51) Int. Cl.
| | | |
|---|---|---|
| *H04L 12/24* | (2006.01) | |
| *H04L 29/06* | (2006.01) | |
| *H04L 29/08* | (2006.01) | |
| *H04W 36/00* | (2009.01) | |
| *H04W 76/12* | (2018.01) | |
| *H04W 76/11* | (2018.01) | |
| *H04W 8/08* | (2009.01) | |
| *H04W 48/20* | (2009.01) | |
| *H04W 60/00* | (2009.01) | |
| *H04W 88/02* | (2009.01) | |
| *H04W 88/06* | (2009.01) | |
| *H04W 8/26* | (2009.01) | |
| *H04W 48/18* | (2009.01) | |
| *H04W 84/04* | (2009.01) | |

(52) U.S. Cl.
CPC ...... *H04L 41/5051* (2013.01); *H04L 65/1069* (2013.01); *H04L 65/1073* (2013.01); *H04L 67/16* (2013.01); *H04W 8/08* (2013.01); *H04W 8/26* (2013.01); *H04W 36/00835* (2018.08); *H04W 48/18* (2013.01); *H04W 48/20* (2013.01); *H04W 60/00* (2013.01); *H04W 76/11* (2018.02); *H04W 76/12* (2018.02); *H04W 88/023* (2013.01); *H04W 88/06* (2013.01); *H04L 41/0893* (2013.01); *H04W 84/042* (2013.01)

(56) References Cited

U.S. PATENT DOCUMENTS

| | | | | |
|---|---|---|---|---|
| 2017/0070892 | A1* | 3/2017 | Song | H04L 41/042 |
| 2017/0332226 | A1* | 11/2017 | Bharatia | H04W 76/12 |
| 2017/0339609 | A1* | 11/2017 | Youn | H04W 76/11 |
| 2018/0227873 | A1 | 8/2018 | Vrzic et al. | |
| 2018/0317133 | A1* | 11/2018 | Sciancalepore | H04W 16/02 |
| 2018/0324583 | A1* | 11/2018 | Nair | H04W 76/11 |
| 2019/0021047 | A1* | 1/2019 | Zong | H04W 76/11 |
| 2019/0045351 | A1* | 2/2019 | Zee | H04W 8/06 |
| 2019/0098537 | A1* | 3/2019 | Qiao | H04W 36/0033 |
| 2019/0124508 | A1 | 4/2019 | Watfa et al. | |
| 2019/0124561 | A1 | 4/2019 | Faccin et al. | |
| 2019/0200207 | A1* | 6/2019 | Lauster | H04W 8/06 |

FOREIGN PATENT DOCUMENTS

| | | |
|---|---|---|
| CN | 105813079 A | 7/2016 |
| CN | 106210042 A | 12/2016 |
| CN | 106341832 A | 1/2017 |
| CN | 106713406 A | 5/2017 |

OTHER PUBLICATIONS

Ericsson, "23.501: SMF selection," XP051205583 (revision of S2-17XXXX), S2-170141, SA WG2 Meeting #118BIS, Jan. 16-20, 2017, 3 pages.
Foreign Communication From a Counterpart Application, European Application No. 17901341.2, Extended European Search Report dated Apr. 26, 2019, 11 pages.
Machine Translation and Abstract of Chinese Publication No. CN106210042, Dec. 7, 2016, 8 pages.
Machine Translation and Abstract of Chinese Publication No. CN106341832, Jan. 18, 2017, 23 pages.
Machine Translation and Abstract of Chinese Publication No. CN106713406, May 24, 2017, 25 pages.
Machine Translation and Abstract of Chinese Publication No. CN105813079, Jul. 27, 2016, 16 pages.
"3rd Generation Partnership Project; Technical Specification Group Services and System Aspects; System Architecture for the 5G System; Stage 2 (Release 15)," 3GPP TS 23.501 V1.0.0, Jun. 2017, 146 pages.
"3rd Generation Partnership Project; Technical Specification Group Services and System Aspects; Procedures for the 5G System; Stage 2 (Release 15)," 3GPP TS 23.502 V0.4.0, May 2017, 126 pages.
Samsung, "TS 23.501: UE without any NSSAI for the PLMN," S2-173268, SA WG2 Meeting #121, May 15-19, 2017, 2 pages.
"Presentation of TR 23.501: System Architecture for the 5G System (Release 15) to TSG SA for Approval," TD SP-170384, S2-174079, Cover Sheet for TS 23501 SA WG2, 3GPP TSG SA Meeting #76, Jun. 7-9, 2017, 2 pages.
"3rd Generation Partnership Project; Technical Specification Group Services and System Aspects; Procedures for the 5G System; Stage 2 (Release 15)," 3GPP TS 23.502, V0.2.0, Feb. 2017, 71 pages.
Foreign Communication From a Counterpart Application, PCT Application No. PCT/CN2017/089016, English Translation of International Search Report dated Jan. 3, 2018, 2 pages.
Foreign Communication From a Counterpart Application, Chinese Application No. 201810747416.8, Chinese Office Action dated Jan. 28, 2019, 3 pages.
Foreign Communication From a Counterpart Application, Chinese Application No. 201810747416.8, Chinese Search Report dated Jan. 18, 2019, 2 pages.
Notice of Allowance dated May 17, 2019, 10 pages, U.S. Appl. No. 16/314,180, filed Dec. 28, 2018.
Qualcomm Incorporated, "TS 23.502: handling of PDU sessions at slice unavailability," S2-173106, SA WG2 Meeting #121, Hangzhou, P.R. China, May 15-19, 2017, 33 pages.
Samsung, et al., "TS 23.501: PLMN-specific NSSAI," S2-171891, SA WG2 Meeting #120, Busan, South Korea, Mar. 27-31, 2017, 5 pages.
Foreign Communication From A Counterpart Application, Japanese Application No. 2018-555716, Japanese Office Action dated Nov. 5, 2019, 4 pages.
Foreign Communication From A Counterpart Application, Japanese Application No. 2018-555716, English Translation of Japanese Office Action dated Nov. 5, 2019, 5 pages.

* cited by examiner

REGISTRATION METHOD, SESSION ESTABLISHMENT METHOD, TERMINAL, AND AMF ENTITY

CROSS-REFERENCE TO RELATED APPLICATIONS

This application is a continuation of U.S. patent application Ser. No. 16/314,180, filed on Dec. 28, 2018, which is a National Stage of International Patent Application No. PCT/CN2017/089016 filed on Jun. 19, 2017. Both of the aforementioned applications are hereby incorporated by reference in their entireties.

TECHNICAL FIELD

Embodiments of this application relate to the field of communications technologies, and in particular, to a registration method for a terminal, a session establishment method, a terminal, and an access and mobility management function (access and mobility management function, AMF) entity.

BACKGROUND

As communications technologies develop and a requirement of a user on a communications network is ever-increasing, a 5G communications network technology (or referred to as 5th generation mobile communications technology) is being rapidly standardized. A logical concept of a network slice is introduced in the 5G communications network technology. An operator pre-configures a network slice selection policy (network slice selection policy, NSSP) for a terminal. It should be noted that, the terminal may also be referred to as user equipment (user equipment, UE). The pre-configured NSSP includes one or more rules (rule), and each rule associates a third-party application program (application, App) to single network slice selection information (single network slice selection assistance information, S-NSSAI). When the UE needs to use an app, the UE obtains corresponding S-NSSAI through mapping based on the rule in the NSSP, and establishes a protocol data unit (protocol data unit, PDU) session (session) in a network slice corresponding to the S-NSSAI.

However, a case in which an NSSP in a visited public land mobile network (visited public land mobile network, VPLMN) is not configured for the UE may exist. When the UE roams to the VPLMN, the UE has no NSSP in the VPLMN, and consequently cannot determine a network slice in which a PDU session established. Alternatively, the following case may exist: When the UE roams to a VPLMN, the UE obtains an NSSP in the VPLMN, but when the UE needs to use an app of a home public land mobile network (home public land mobile network, HPLMN), the UE cannot find a corresponding rule from the NSSP in the VPLMN, and consequently the UE cannot determine to-be-used S-NSSAI to establish a PDU session.

SUMMARY

Embodiments of this application provide a registration method for a terminal, a session establishment method, a terminal, and an AMF entity, so that the terminal obtains an NSSP in a VPLMN or an HPLMN in which the terminal is located, to accurately determine S-NSSAI in the VPLMN or the HPLMN in a PDU session establishment process, and complete PDU session establishment.

According to a first aspect, an embodiment of this application provides a registration method for a terminal, where the registration method includes:

sending, by a terminal, a registration request message to an access and mobility management function AMF entity, where the registration request message includes a first parameter such as need NSSP indication information, and the first parameter is used to request a network slice selection policy; and receiving, by the terminal, a registration accept message sent by the AMF entity, where the registration accept message includes the network slice selection policy, so that in a process in which the terminal subsequently establishes a PDU session, the terminal can accurately determine corresponding S-NSSAI based on an NSSP in a current VPLMN or an NSSP in a current HPLMN, and the following case is avoided: When the terminal establishes a PDU session, the AMF entity cannot find S-NSSAI corresponding to a network in which the terminal is located, and cannot complete PDU session establishment, and consequently the terminal cannot perform communication.

According to a second aspect, an embodiment of this application provides a session establishment method, where the method may include: sending, by a terminal, a first message to an access and mobility management function AMF entity, where the first message includes first information, first network slice selection information, and second network slice selection information, the first information includes information for requesting to establish a protocol data unit PDU session, the first network slice selection information is used by the AMF entity to select a first session management control function SMF entity, and the second network slice selection information is used by the AMF entity to select a second SMF entity, so that in a PDU session establishment process, the AMF entity accurately determines S-NSSAI, and completes PDU session establishment; and receiving, by the terminal, a second message sent by the AMF entity, where the second message includes second information, and the second information includes PDU session establishment accept information.

In an implementation, the first network slice selection information is single network slice selection assistance information S-NSSAI corresponding to a first application in a visited public land mobile network VPLMN, and the second network slice selection information is S-NSSAI corresponding to the first application in a home public land mobile network HPLMN.

Optionally, in another implementation, the first message further includes indication information, where the indication information is used to indicate that the first network slice selection information is single network slice selection assistance information S-NSSAI in a visited public land mobile network VPLMN, or the indication information is used to indicate that the first network slice selection information is S-NSSAI in a home public land mobile network HPLMN.

According to a third aspect, an embodiment of this application provides a session establishment method, where the method includes:

sending, by a terminal, a first message to an access and mobility network management function AMF entity, where the first message includes first information, network slice selection information, and indication information, the first information includes information for requesting to establish a protocol data unit PDU session, the network slice selection information is used by the AMF entity to select a session management control function SMF entity, and the indication information is used to indicate that the network slice selection information is single network slice selection assistance information S-NSSAI in a visited public land mobile network VPLMN, or is used to indicate that the network slice selection information is S-NSSAI in a home public land mobile network HPLMN, so that in a PDU session establishment process, the AMF entity accurately determines S-NSSAI, and completes PDU session establishment; and receiving, by the terminal, a second message sent by the AMF entity, where the second message includes second information, and the second information includes PDU session establishment accept information.

In a possible implementation, the network slice selection information is S-NSSAI corresponding to a first application.

Optionally, in another possible implementation, before the sending, by user equipment, a first message to an access and mobility management function AMF entity, the method may further include: determining, by the terminal, the network slice selection information.

In a possible implementation, the determining, by the terminal, the network slice selection information includes:

if S-NSSAI corresponding to the first application exists in a network slice selection policy in the visited public land mobile network VPLMN, determining, by the terminal, the S-NSSAI as the network slice selection information; or if S-NSSAI corresponding to the first application exists in a network slice selection policy in the home public land mobile network HPLMN, determining, by the terminal, the S-NSSAI as the network slice selection information.

In the embodiments of this application, the session establishment method provided in the second aspect and the session establishment method provided in the third aspect may be implemented on a basis of the registration method provided in the first aspect.

According to a fourth aspect, an embodiment of this application provides a registration method, where the method may include:

receiving, by an access and mobility management function AMF entity, a registration request message sent by a terminal, where the registration request message includes a first parameter, and the first parameter is used to request a network slice selection policy;

obtaining, by the AMF, a network slice selection policy based on the registration request message; and sending, by the AMF, a registration accept message to the terminal, where the registration accept message includes the network slice selection policy.

After the solution provided in this embodiment of this application is used, in a PDU session establishment process, the terminal can accurately determine S-NSSAI based on an NSSP in a VPLMN or an HPLMN in which the terminal is currently located, to complete PDU session establishment.

Optionally, in a possible implementation, the obtaining, by the AMF entity, a network slice selection policy based on the registration request message may include:

sending, by the AMF entity, a first message to a policy control function PCF entity, where the first message includes the first parameter; and receiving, by the AMF entity, a second message sent by the PCF entity, where the second message includes the network slice selection policy.

According to a fifth aspect, an embodiment of this application provides a session establishment method, where the method includes: receiving, by an access and mobility management function AMF entity, a first message sent by a terminal, where the first message includes first information, first network slice selection information, and second network slice selection information, and the first information includes information for requesting to establish a protocol data unit PDU session;

determining, by the AMF entity, a first session management control function SMF entity based on the first network slice selection information, and determining a second SMF entity based on the second network slice selection information; and sending, by the AMF entity, a second message to the terminal, where the second message includes second information, and the second information includes PDU session establishment accept information.

After the solution provided in this embodiment of this application is used, the AMF entity can accurately determine corresponding S-NSSAI based on the message that is sent by the terminal and that includes the first network slice selection information and the second network slice selection information, to complete PDU session establishment.

Optionally, in a possible implementation, the first network slice selection information is single network slice selection assistance information S-NSSAI corresponding to a first application in a visited public land mobile network VPLMN; and the second network slice selection information is S-NSSAI corresponding to the first application in a home public land mobile network HPLMN.

Optionally, in another possible implementation, the first message further includes indication information, where the indication information is used to indicate that the first network slice selection information is single network slice selection assistance information S-NSSAI in a visited public land mobile network VPLMN, or the indication information is used to indicate that the first network slice selection information is S-NSSAI in a home public land mobile network HPLMN.

According to a sixth aspect, an embodiment of this application provides a session establishment method, where the method includes:

receiving, by an access and mobility management function AMF entity, a first message sent by a terminal, where the first message includes first information, first network slice selection information, and indication information, the first information includes information for requesting to establish a protocol data unit PDU session, and the indication information is used to indicate that the first network slice selection information is single network slice selection assistance information S-NSSAI in a visited public land mobile network VPLMN, or is used to indicate that the network slice selection information is S-NSSAI in a home public land mobile network HPLMN;

determining, by the AMF based on the indication information, that the first network slice selection information is the single network slice selection assistance information S-NSSAI in the VPLMN or the first network slice selection information is the S-NSSAI in the HPLMN, selecting a first session management control function SMF entity based on the first network slice selection information, determining second network slice selection information based on the first network slice selection information and information about a correspondence between VPLMN S-NSSAI and HPLMN S-NSSAI, and selecting a second SMF entity based on the second network slice selection information; and sending, by the AMF entity, a second message to the terminal, where the second message includes second information, and the second information includes PDU session establishment accept information.

After the solution provided in this embodiment of this application is used, the AMF entity can accurately determine to-be-used S-NSSAI based on the first network slice selection information and the indication information, to complete PDU session establishment.

Optionally, in a possible implementation, the first network slice selection information is S-NSSAI corresponding to a first application.

In the embodiments of this application, the session establishment method provided in the fifth aspect and the session establishment method provided in the sixth aspect may be implemented on a basis of the registration method provided in the fourth aspect.

According to a seventh aspect, an embodiment of this application provides a terminal, where the terminal includes a sending unit and a receiving unit that are configured to complete the method/steps in the first aspect. In addition, the terminal may further include a processing unit and a storage unit, where the processing unit is configured to process related data, and the storage unit is configured to store a related instruction and related data.

According to an eighth aspect, an embodiment of this application provides a terminal, where the terminal includes a sending unit and a receiving unit that are configured to complete the method/steps in any one of the second aspect or the possible implementations of the second aspect. In addition, the terminal may further include a processing unit and a storage unit, where the processing unit is configured to process related data, and the storage unit is configured to store a related instruction and related data.

According to a ninth aspect, an embodiment of this application provides a terminal, where the terminal includes a sending unit, a receiving unit, and a processing unit that are configured to complete the method/steps in any one of the third aspect or the possible implementations of the third aspect. In addition, the terminal may further include a storage unit, where the storage unit is configured to store a related instruction and related data.

According to a tenth aspect, an embodiment of this application provides an access and mobility management function entity, where the access and mobility management function entity includes a receiving unit, a processing unit, and a sending unit that are configured to complete the method/steps in any one of the fourth aspect or the possible implementations of the fourth aspect. In addition, the access and mobility management function entity may further include a storage unit, where the storage unit is configured to store a related instruction and related data.

According to an eleventh aspect, an embodiment of this application provides an access and mobility management function entity, where the access and mobility management function entity includes a receiving unit, a processing unit, and a sending unit that are configured to complete the method/steps in any one of the fifth aspect or the possible implementations of the fifth aspect. In addition, the access and mobility management function entity may further include a storage unit, where the storage unit is configured to store a related instruction and related data.

According to a twelfth aspect, an embodiment of this application provides an access and mobility management function entity, where the access and mobility management function entity includes a receiving unit, a processing unit, and a sending unit that are configured to complete the method/steps in any one of the sixth aspect or the possible implementations of the sixth aspect. In addition, the access and mobility management function entity may further include a storage unit, where the storage unit is configured to store a related instruction and related data.

According to a thirteenth aspect, an embodiment of this application provides a terminal, where the terminal includes:

a transmitter, configured to send a registration request message to an access and mobility management function AMF entity, where the registration request message includes a first parameter, and the first parameter is used to request a network slice selection policy; and a receiver, configured to receive a registration accept message sent by the AMF entity, where the registration accept message includes the network slice selection policy, so that in a process in which the terminal subsequently establishes a PDU session, the terminal can accurately determine corresponding S-NSSAI based on an NSSP in a current VPLMN or HPLMN, and the following case is avoided: When the terminal establishes a PDU session, the AMF entity cannot find S-NSSAI corresponding to a network in which the terminal is located, and cannot complete PDU session establishment, and consequently the terminal cannot perform communication.

According to a fourteenth aspect, an embodiment of this application provides a terminal, where the terminal includes:

a transmitter, configured to send a first message to an access and mobility management function AMF entity, where the first message includes first information, first network slice selection information, and second network slice selection information, the first information includes information for requesting to establish a protocol data unit PDU session, the first network slice selection information is used by the AMF entity to select a first session management control function SMF entity, and the second network slice selection information is used by the AMF entity to select a second SMF entity; and a receiver, configured to receive a second message sent by the AMF entity, where the second message includes second information, and the second information includes PDU session establishment accept information.

After the terminal provided in this embodiment of this application is used, in a PDU session establishment process, the AMF entity can accurately determine S-NSSAI, to complete PDU session establishment. The following case is avoided: When the terminal establishes a PDU session, the AMF entity cannot find S-NSSAI corresponding to a network in which the terminal is located, and cannot complete PDU session establishment, and consequently the terminal cannot perform communication.

Optionally, in a possible implementation, the first network slice selection information is single network slice selection assistance information S-NSSAI corresponding to a first application in a visited public land mobile network VPLMN, and the second network slice selection information is S-NSSAI corresponding to the first application in a home public land mobile network HPLMN.

Optionally, in another possible implementation, the first message further includes indication information, where the indication information is used to indicate that the first network slice selection information is single network slice selection assistance information S-NSSAI in a visited public land mobile network VPLMN, or the indication information is used to indicate that the first network slice selection information is S-NSSAI in a home public land mobile network HPLMN.

According to a fifteenth aspect, an embodiment of this application provides a terminal, where the terminal may include:

a transmitter, configured to send a first message to an access and mobility network management function AMF entity, where the first message includes first information, network slice selection information, and indication information, the first information includes information for requesting to establish a protocol data unit PDU session, the network slice selection information is used by the AMF entity to select a session management control function SMF entity, and the indication information is used to indicate that the network slice selection information is single network slice selection assistance information S-NSSAI in a visited public land mobile network VPLMN, or is used to indicate that the network slice selection information is S-NSSAI in a home public land mobile network HPLMN; and a receiver, configured to receive a second message sent by the AMF entity, where the second message includes second information, and the second information includes PDU session establishment accept information.

After the terminal provided in this embodiment of this application is used, in a PDU session establishment process, the AMF entity can accurately determine S-NSSAI, to complete PDU session establishment. The following case is avoided: When the terminal establishes a PDU session, the AMF entity cannot find S-NSSAI corresponding to a network in which the terminal is located, and cannot complete PDU session establishment, and consequently the terminal cannot perform communication.

Optionally, in a possible implementation, the network slice selection information is S-NSSAI corresponding to a first application.

Optionally, in another possible implementation, the terminal further includes a processor, configured to determine the network slice selection information.

Optionally, in a possible implementation, that the processor determines the network slice selection information includes:

if S-NSSAI corresponding to the first application exists in a network slice selection policy in the visited public land mobile network VPLMN, determining, by the terminal, the S-NSSAI as the network slice selection information; or if S-NSSAI corresponding to the first application exists in a network slice selection policy in the home public land mobile network HPLMN, determining, by the terminal, the S-NSSAI as the network slice selection information.

According to a sixteenth aspect, an embodiment of this application provides an access and mobility management function AMF entity, where the AMF entity includes:

a receiver, configured to receive a registration request message sent by a terminal, where the registration request message includes a first parameter, and the first parameter is used to request a network slice selection policy;

a processor, configured to obtain a network slice selection policy based on the registration request message; and a transmitter, configured to send a registration accept message to the terminal, where the registration accept message includes the network slice selection policy.

A network slice selection policy in a network in which the terminal is located is obtained by using the first parameter sent by the terminal to the AMF entity, so that when a PDU session is subsequently established, corresponding S-NSSAI is accurately determined based on the network slice selection policy, and the following case is avoided: When the terminal establishes a PDU session, the AMF entity cannot find S-NSSAI corresponding to the network in which the terminal is located, and cannot complete PDU session establishment, and consequently the terminal cannot perform communication.

Optionally, in a possible implementation, that the processor obtains a network slice selection policy based on the registration request message includes:

sending, by the transmitter, a first message to a policy control function PCF entity, where the first message includes the first parameter; and receiving, by the receiver, a second message sent by the PCF entity, where the second message includes the network slice selection policy.

According to a seventeenth aspect, an embodiment of this application provides an access and mobility management function AMF entity, where the AMF entity includes:

a receiver, configured to receive a first message sent by a terminal, where the first message includes first information, first network slice selection information, and second network slice selection information, and the first information includes information for requesting to establish a protocol data unit PDU session;

a processor, configured to: determine a first session management control function SMF entity based on the first network slice selection information, and determine a second SMF entity based on the second network slice selection information; and a transmitter, configured to send a second message to the terminal, where the second message includes second information, and the second information includes PDU session establishment accept information.

Therefore, in a process in which the terminal subsequently establishes a PDU session, the terminal can accurately determine corresponding S-NSSAI based on an NSSP in a current VPLMN or HPLMN, and the following case is avoided: When the terminal establishes a PDU session, the AMF entity cannot find S-NSSAI corresponding to a network in which the terminal is located, and cannot complete PDU session establishment, and consequently the terminal cannot perform communication.

Optionally, in a possible implementation, the first network slice selection information is single network slice selection assistance information S-NSSAI corresponding to a first application in a visited public land mobile network VPLMN; and the second network slice selection information is S-NSSAI corresponding to the first application in a home public land mobile network HPLMN.

In another possible implementation, the first message further includes indication information, where the indication information is used to indicate that the first network slice selection information is single network slice selection assistance information S-NSSAI in a visited public land mobile network VPLMN, or the indication information is used to indicate that the first network slice selection information is S-NSSAI in a home public land mobile network HPLMN.

According to an eighteenth aspect, an embodiment of this application provides an access and mobility management function AMF entity, where the AMF entity includes:

a receiver, configured to receive a first message sent by a terminal, where the first message includes first information, first network slice selection information, and indication information, the first information includes information for requesting to establish a protocol data unit PDU session, and the indication information is used to indicate that the first network slice selection information is single network slice selection assistance information S-NSSAI in a visited public land mobile network VPLMN, or is used to indicate that the network slice selection information is S-NSSAI in a home public land mobile network HPLMN;

a processor, configured to: determine, based on the indication information, that the first network slice selection information is the single network slice selection assistance information S-NSSAI in the VPLMN or the first network slice selection information is the S-NSSAI in the HPLMN, select a first session management control function SMF entity based on the first network slice selection information, determine second network slice selection information based on the first network slice selection information and information about a correspondence between VPLMN S-NSSAI and HPLMN S-NSSAI, and select a second SMF entity based on the second network slice selection information; and a transmitter, configured to send a second message to the terminal, where the second message includes second information, and the second information includes PDU session establishment accept information.

After the solution provided in this embodiment of this application is used, the AMF entity can accurately determine to-be-used S-NSSAI based on the first network slice selection information and the indication information, to complete PDU session establishment.

In a possible implementation, the first network slice selection information is S-NSSAI corresponding to a first application.

According to a nineteenth aspect, an embodiment of this application provides a computer program product including an instruction, and when the instruction runs on a computer, the method/steps in any one of the first to the sixth aspect or the possible implementations thereof is/are performed.

According to a twentieth aspect, an embodiment of this application provides a computer readable storage medium, configured to store an instruction, and when the instruction is executed on a computer, the method/steps in any one of the first to the sixth aspect or the possible implementations thereof is/are performed.

DESCRIPTION OF EMBODIMENTS

The following describes the embodiments of this application with reference to the accompanying drawings in the embodiments of this application.

The embodiments of this application provide a registration method, a session establishment method, a terminal, and an AMF entity that are applied to a 5G communications network. A logical concept of a network slice and a structure of the network slice are introduced in a core network in the 5G communications network.

A network slice is a set of logical network function entities that support a particular communication service requirement, and mainly implements a customizable service for a communication service by using a software-defined networking (software-defined network, SND) technology and a Network Functions Virtualization (network functions virtualization, NFV) technology. The logical network function entity mentioned herein may include an AMF entity, an SMF entity, and a UPF entity that are mentioned below. For details, refer to descriptions in FIG. 2.

The NFV technology may implement mapping of an underlying physical resource into a virtualization resource, construction of a virtual machine, and loading of a network function (network function, NF). The SDN technology may implement a logical connection between virtual machines and construction of channels for bearer signaling and a data flow. The network slice finally implements a dynamic connection between network function entities in a radio access network (radio access network, RAN) and the core network (core network, CN), configures an end-to-end service chain, and implements flexible networking, to implement a customizable network service. An operator may determine a network slice based on a requirement of each specific communication service on a key performance indicator (key performance indicator, KPI) such as a capacity, coverage, a speed, and a latency, and the network slice includes a set of network function entities, to provide a required telecommunication service and network capability service for a user, and meet a particular market scenario and requirement.

Figure 1:
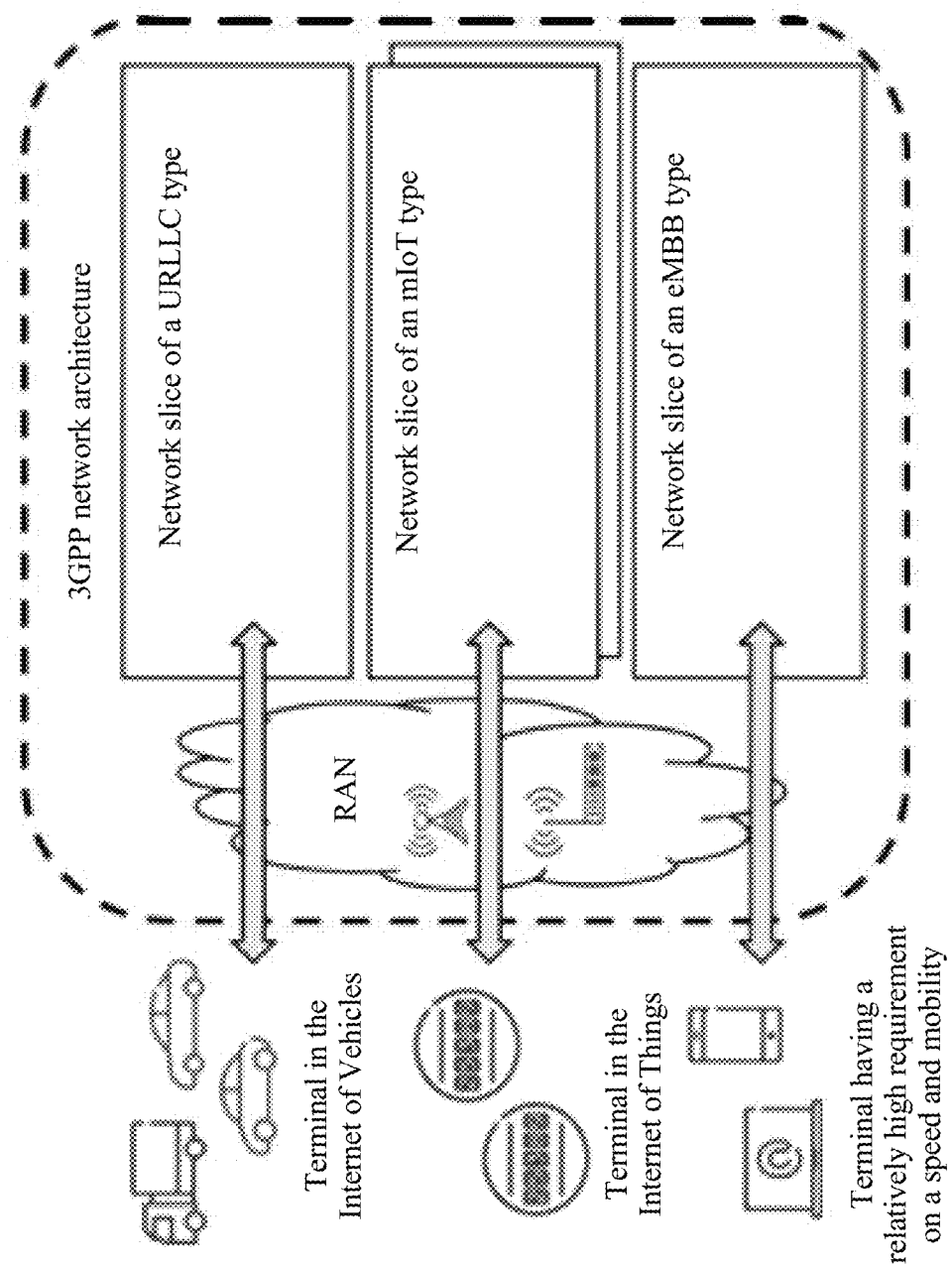
FIG. 1 is a schematic diagram of a network architecture in which the 3GPP supports a plurality of network slices according to an embodiment of this application.

As shown in FIG. 1, FIG. 1 is a schematic diagram of a network architecture in which the 3rd Generation Partnership Project (the third generation partnership project, 3GPP) supports a plurality of network slices. The 3GPP classifies a 5G network slice into the following three main types: a network slice of an enhanced mobile broadband (enhanced mobile broadband, eMBB) service type, a network slice of a massive Internet of Things (massive internet of things, mIoT) service type, a network slice of an ultra-reliable and low latency communications (ultra-reliable and low latency communications, URLLC) service type, a multimedia device, and the like. The network slice of the mIoT type is mainly for a terminal in the Internet of Things, and the terminal has a requirement on massiveness, low mobility, and a relatively low speed. The network slice of the URLLC type is mainly for a terminal in the Internet of Vehicles, and the terminal has a relatively high requirement on a latency and reliability. For example, a mobile phone may access the network slice of the eMBB type for high-speed downloading and 4K high-definition video viewing, and a sensor device may access the network slice of an mMTC type for small data transmission and system configuration update.

To enable one terminal to support a plurality of communication services to improve user experience, one terminal is allowed to access one or more network slices, and technical solutions in the embodiments of this application are applicable to a scenario in which one terminal accesses one or more network slices.

To be specific, each network slice provides a particular service for a particular terminal. The terminal (terminal) in the embodiments of this application may also be referred to as user equipment (user equipment, UE), and may be a device that provides voice and/or data connectivity for a user, a handheld device with a wireless connection function, or another processing device connected to a wireless modem. The wireless terminal may communicate with one or more core networks by using a RAN. The wireless terminal may be a mobile terminal, such as a mobile phone (or referred to as a "cellular" phone) and a computer with a mobile terminal device. For example, the wireless terminal may be a portable, pocket-sized, handheld, computer built-in, or in-vehicle mobile apparatus that exchanges voice and/or data with the radio access network. For example, the wireless terminal may be a device such as a personal communications service (personal communications service, PCS) phone, a cordless telephone set, a Session Initiation Protocol (session initiated protocol, SIP) phone, a wireless local loop (wireless local loop, WLL) station, or a personal digital assistant (personal digital assistant, PDA). The wireless terminal may also be referred to as a system, a subscriber unit (subscriber unit), a subscriber station (subscriber station), a mobile station (mobile station), a mobile station (mobile), a remote station (remote station), an access point (access point), a remote terminal (remote terminal), an access terminal (access terminal), a user terminal (user terminal), a user agent (user agent), a user device (user device), or user equipment (user equipment). This is not limited in the embodiments of this application. Based on a service type, the UE in the embodiments of the present invention may be the foregoing terminal device that has a relatively high requirement on a speed and mobility, for example, a mobile phone or a multimedia device, or may be a terminal in the Internet of Things, or may be a terminal in the Internet of Vehicles.

A network slice is implemented as a network slice instance (network slice instance, NSI) during network deployment. One network slice may be implemented as a plurality of network slice instances.

Figure 2:
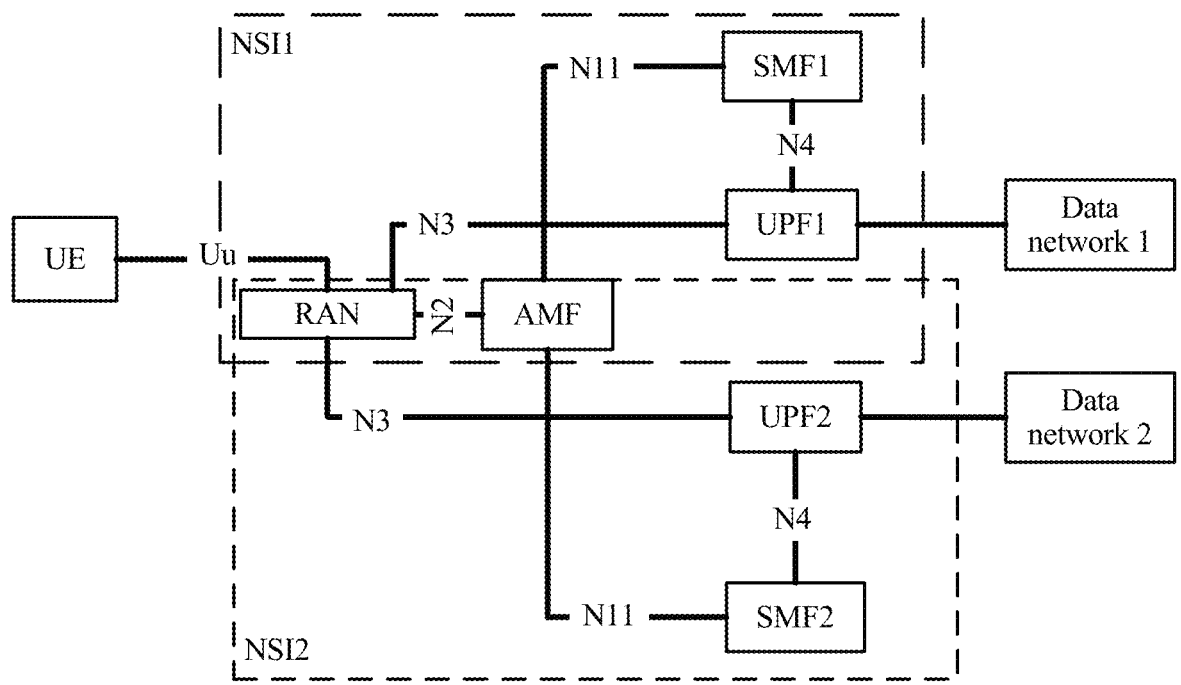
FIG. 2 is a schematic structural diagram of a core network in a 5G communications network according to an embodiment of this application.

One UE may use a plurality of NSIs, and the NSIs may share a RAN device and an AMF entity, but a session management function (session management control function, SMF) entity and a user plane function (user plane function, UPF) entity are network elements unique to the NSI. As shown in FIG. 2, FIG. 2 is a schematic structural diagram of a core network in a 5G communications network according to an embodiment of this application.

In the embodiments of this application, the AMF entity, the SMF entity, and the UPF entity may be one or more servers in the core network.

The AMF entity has functions such as mobility management, registration management, and connection management for the UE, lawful interception, transmission of session management (session management, SM) information between the UE and the SMF entity, access authentication, and access authorization.

The SMF entity has functions such as session management and roaming. The session management function is, for example, session establishment, modification, and release, and includes maintenance of a tunnel between the UPF and an access network (access network, AN) node (node). The roaming function may include charging data collection, and transmission of signaling for authentication/authorization with an external (external) data network (data network, DN).

The UPF entity has functions such as packet routing and lawful interception.

In FIG. 2, one UE may use two network slice instances NSI1 and NSI2. The NSI1 and the NSI2 share a RAN device and an AMF entity. An SMF1 entity and a UPF1 entity are network elements unique to the NSI1, and an SMF2 entity and a UPF2 entity are network elements unique to the NSI2. The UPF1 entity and the UPF2 entity are respectively connected to a corresponding data network (data network) 1 and data network 2.

The UE is connected to the RAN by using a Uu interface. Data between the RAN and UPF1 entity and that between the RAN and UPF2 entity are transmitted by using an N3 interface. Signaling and data between the RAN device and the AMF entity are transmitted by using an N2 interface. Signaling and data between the AMF entity and the SMF1 entity and those between the AMF entity and the SMF2 entity are transmitted by using an N11 interface. Signaling and data between the SMF1 entity and the UPF1 entity and those between the SMF1 entity and the UPF1 entity are transmitted by using N4. It should be noted that, the Uu interface, the N2 interface, the N3 interface, the N11 interface, and the N4 interface are already defined in a standard.

When the UE roams to a visited public land mobile network VPLMN, based on a network decision and UE subscription, a roaming scenario may fall into two types: home routed (home routed) and local breakout (local breakout). Network architectures of the two scenarios are shown in FIG. 3 and FIG. 4.

Figure 3:
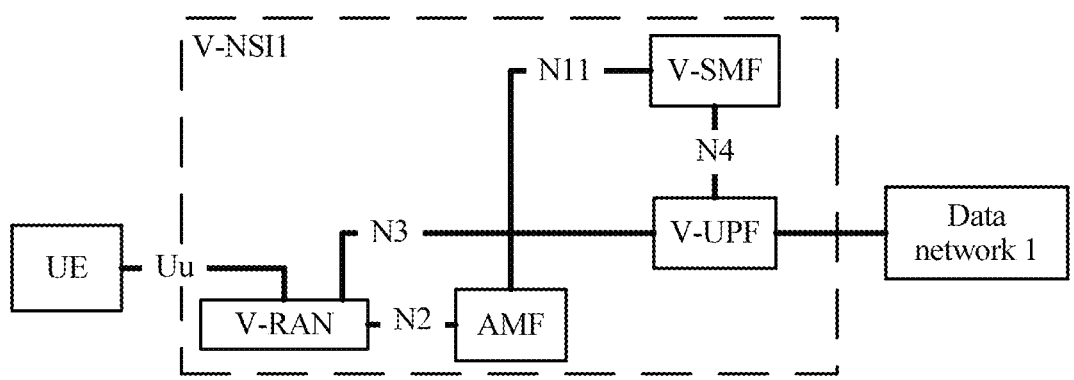
FIG. 3 is a schematic diagram of a network architecture of a local breakout scenario according to an embodiment of this application.
Figure 4:
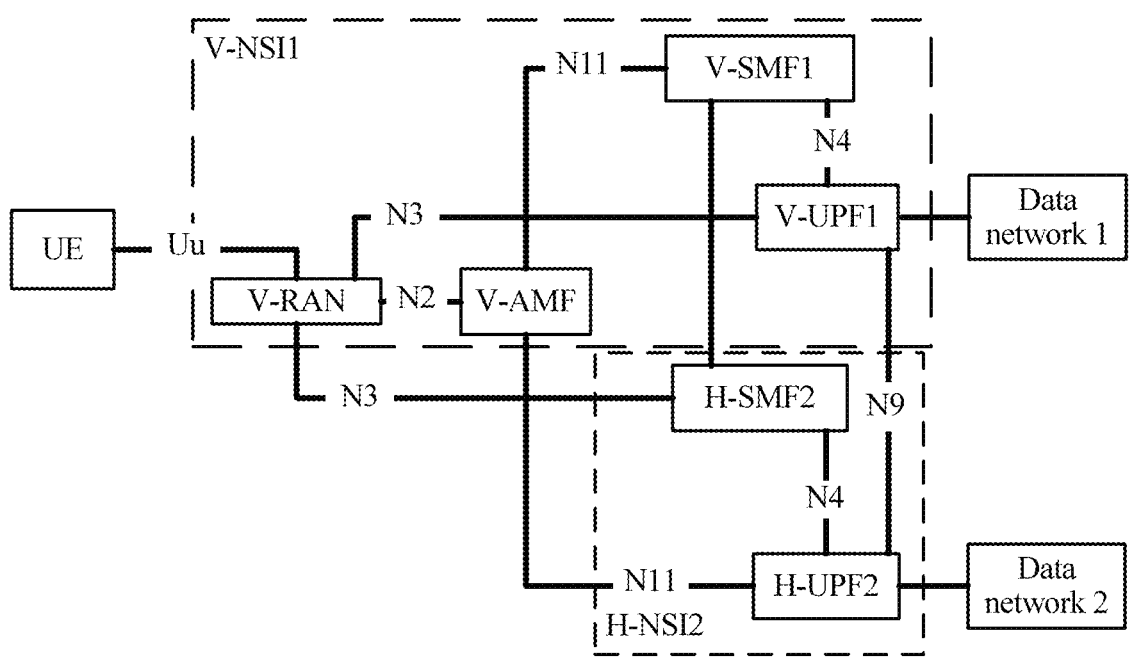
FIG. 4 is a schematic diagram of a network architecture of a home routed scenario according to an embodiment of this application.

FIG. 3 is a schematic diagram of a network architecture of a local breakout scenario according to an embodiment of this application. FIG. 4 is a schematic diagram of a network architecture of a home routed scenario according to an embodiment of this application.

When the UE initiates a PDU session establishment request, the AMF entity first selects a network slice NSI based on S-NSSAI reported by the UE, and then selects unique network elements, namely, an SMF entity and a UPF entity, corresponding to the network slice NSI.

As shown in FIG. 3, the network architecture is a network architecture of the local breakout scenario. In the local breakout scenario, UE roams to a VPLMN and initiates a PDU session establishment request. An AMF entity, in the VPLMN, that is referred to as a V-AMF entity first selects a network slice V-NSI1 in the VPLMN based on S-NSSAI reported by the UE, and then selects unique network elements, namely, a V-SMF entity and a V-UPF entity, corresponding to the V-NSI1. This process is similar to that in a non-roaming case. The V-SMF entity is an SMF entity in the VPLMN in which the UE is located, and the V-UPF entity is a UPF entity in the VPLMN in which the UE is located.

As shown in FIG. 4, the network architecture is a network architecture of the home routed scenario. In the home routed scenario, UE roams to a VPLMN, and the UE uses a V-NSI1. The V-NSI1 includes a V-RAN device, a V-AMF entity, and unique network elements: a V-SMF1 entity and a V-UPF1 entity. The UE uses an H-NSI2 in a home network, and network elements unique to the H-NSI2 are an H-SMF2 entity and an H-UPF2 entity.

When the UE initiates a PDU session establishment request, the V-AMF selects a V-SMF entity based on S-NSSAI in the VPLMN, and selects an H-SMF entity based on S-NSSAI in an HPLMN. The V-SMF entity and the H-SMF entity respectively select a V-UPF entity and an H-UPF entity. Uplink data transmission is: UE→RAN device→V-UPF entity→H-UPF entity, and downlink data transmission is opposite to the uplink data transmission.

With reference to the accompanying drawings, the following describes the session establishment method provided in the embodiments of this application. It should be noted that, the AMF entity mentioned below is the V-AMF entity in the VPLMN, unless otherwise stated.

Figure 5:
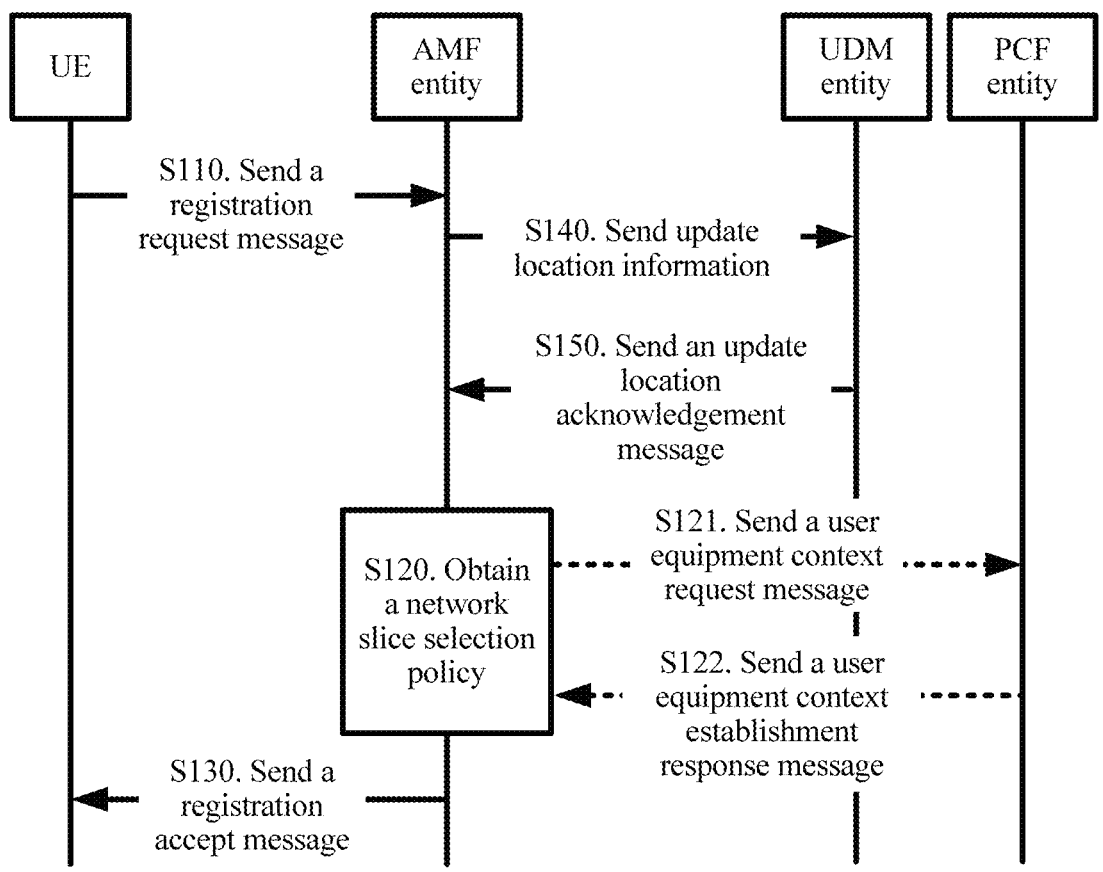
FIG. 5 is a flowchart in which user equipment performs registration according to an embodiment of this application.

When UE roams from a home network to a VPLMN, the UE first needs to perform network registration. A specific network registration process is shown in FIG. 5, and the process may include the following steps.

S110. The UE sends a registration request (registration request) message to an AMF entity.

The registration request message includes a first parameter, and the first parameter is used to request a network slice selection policy. In this embodiment of this application, the first parameter may be need NSSP indication (need NSSP indication) information, and is used to request an NSSP from the AMF entity.

The registration request message may further include an identifier of the UE. The identifier of the UE may be a temporary identifier, namely, an identifier that is temporarily allocated to the UE, for example, a globally unique temporary UE identity (globally unique temporary UE identity, GUTI). In this embodiment of this application, the identifier may be an identifier that is allocated by the AMF entity to the UE during previous registration of the UE.

S120. The AMF entity obtains an NSSP from a policy control function (policy control function, PCF) entity based on the registration request message.

The AMF entity obtains the network slice selection policy NSSP from the PCF entity based on the identifier such as the GUTI of the UE and the first parameter that are in the registration request message.

The PCF entity is a logical function device, may be one or more servers, and is configured to provide a policy for a control-plane entity or the UE, namely, the PCF entity is configured to perform policy management and control.

A process in which the AMF obtains the NSSP from the PCF entity may be specifically steps S121 and S122 that are shown in FIG. 5.

S121. The AMF entity sends a user equipment context establishment request (UE context establishment request) message to the policy control function (policy control function, PCF) entity.

The user equipment context establishment request message includes the first parameter and an identifier of the UE. The identifier of the UE may be a subscription permanent identifier (subscriber permanent identifier, SUPI), and the SUPI may include an international mobile subscriber identity (international mobile subscriber identification, IMSI), a network access identifier (network access identifier, NAI), and the like. The identifier SUPI of the UE is determined by the AMF entity based on the identifier GUTI of the UE. For example, if the SUPI of the UE is an IMSI, the AMF entity determines the identifier IMSI of the UE based on the identifier GUTI of the UE and information that is about a relationship between an identifier GUTI and an identifier IMSI of UE and that is stored in the AMF entity. In other words, the permanent identifier IMSI of the UE can be found based on the temporary identifier GUTI of the UE.

S122. The AMF entity receives a user context establishment response (UE context establishment response) message sent by the PCF entity.

After receiving the user context establishment request message sent by the AMF entity, the PCF entity establishes context of the UE in the PCF entity based on the IMSI of the UE, and sends the user context establishment response message to the AMF entity based on the need NSSP indication information. The user context establishment response message includes the SUPI of the UE and the NSSP of the UE.

After receiving the user context establishment response message, the AMF entity performs step S130.

S130. The AMF entity sends a registration accept (registration accept) message to the UE.

The registration accept includes the NSSP, so that the UE obtains the NSSP in a currently registered VPLMN. Compared with the prior art, the UE may obtain, from the AMF entity, the NSSP in the currently registered VPLMN, instead of obtaining a mapping relationship between HPLMN NSSAI and VPLMN NSSAI from the AMF entity. When obtaining the NSSP in the VPLMN, the UE may accurately determine, based on the NSSP, S-NSSAI that should be used for an app in the current VPLMN.

Optionally, as shown in FIG. 5, in this embodiment of this application, after the AMF entity receives the registration request message sent by the UE, the method may further include the following steps:

S140. The AMF entity sends update location (update location) information to a user data management (user data management, UDM) entity.

The UDM entity may be a server, and is configured to manage user data, for example, location management and subscription management.

The AMF entity determines an IMSI of the UE based on the GUTI of the UE in the received registration request message, and sends the update location information to the UDM. The UDM receives the update location information sent by the AMF, updates the current AMF entity of the UE based on the SUPI of the UE, and sends an update location acknowledgement (update location ack) message to the AMF entity.

S150. The AMF entity receives an update location acknowledgement message sent by the UDM entity.

The update location acknowledgement message includes subscription information, of the UE, that is subsequently used by the AMF to provide a corresponding service included in the subscription information.

After the UE completes registration in the VPLMN and needs to establish a session, steps in FIG. 6A and FIG. 6B, FIG. 7A and FIG. 7B, and FIG. 8A and FIG. 8B are performed.

Figure 6A:
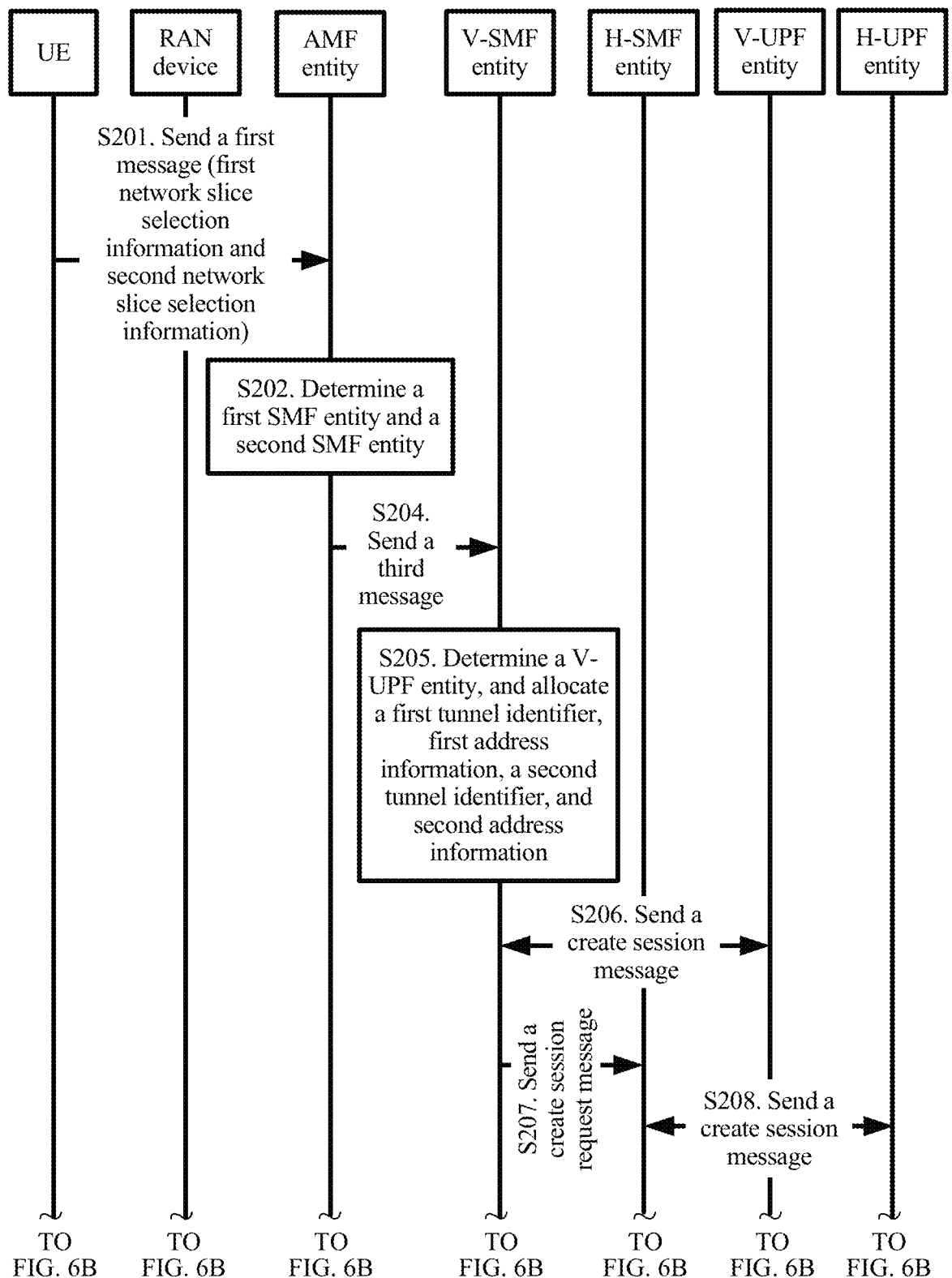
FIG. 6A and FIG. 6B are a flowchart of a session establishment method according to an embodiment of this application.
Figure 6B:
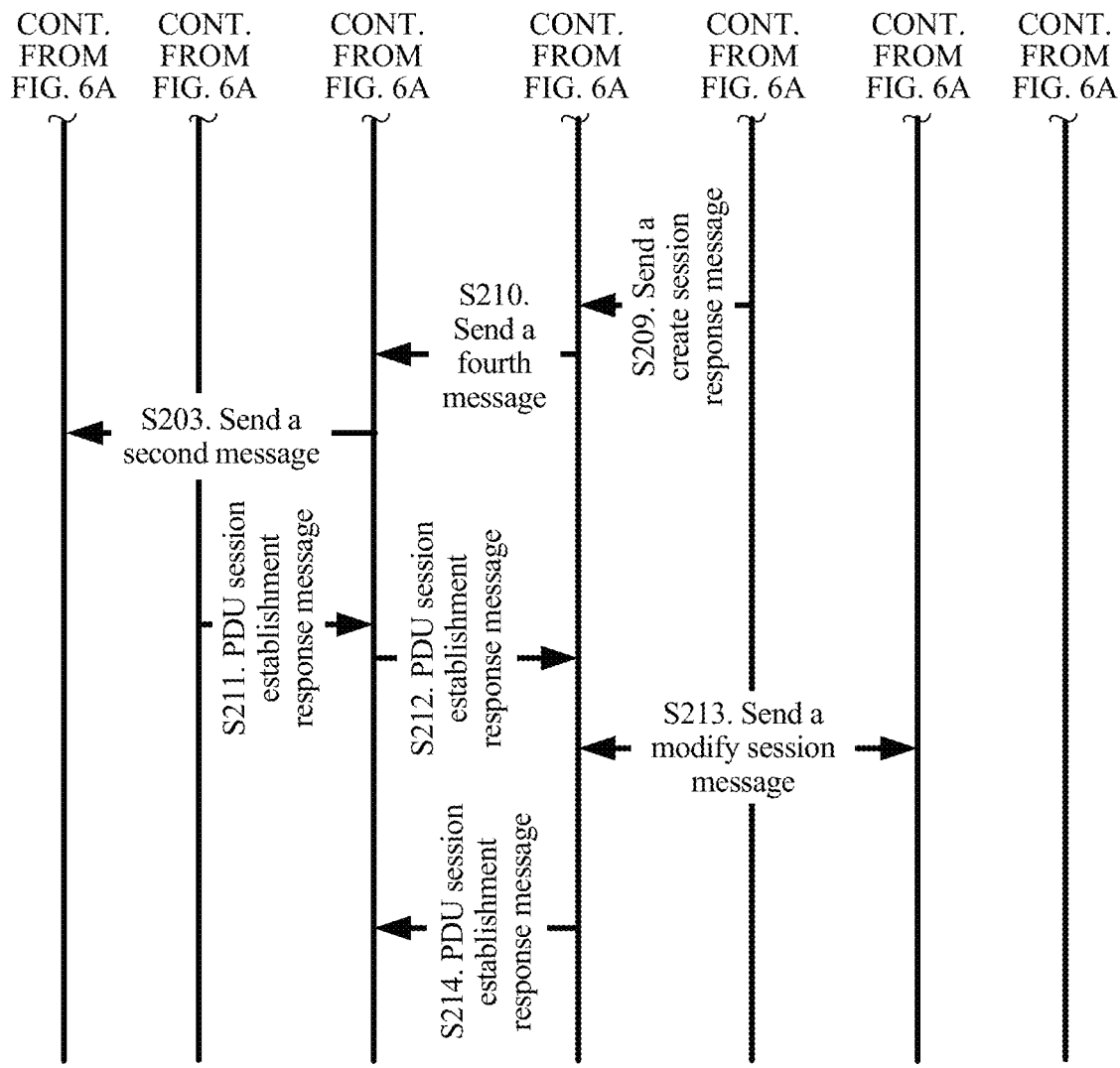

FIG. 6A and FIG. 6B are a flowchart of a session establishment method according to an embodiment of the present invention. As shown in FIG. 6A and FIG. 6B, the method may include the following steps.

S201. UE sends a first message to an AMF entity.

During session establishment, the UE needs to initiate the first message to the AMF entity. The first message includes first information (information), first network slice selection information, and second network slice selection information.

The first information includes information for requesting to establish a PDU session. In this embodiment of this application, the first information may be a message, for example, a PDU session establishment request (PDU session establishment request) message.

The first network slice selection information is used by the AMF entity to select a first SMF entity, for example, the first network slice selection information may be S-NSSAI in a VPLMN. The second network slice selection information is used by the AMF to select a second SMF entity, for example, the second network slice selection information may be S-NSSAI in an HPLMN.

Both the first network slice selection information and the second network slice selection information are used to identify and determine a network slice. Both the first network slice selection information and the second network slice selection information may include information such as a type of a network slice and a name of a vendor that rents the network slice.

S202. The AMF entity determines a first SMF entity based on the first network slice selection information, and determines a second SMF entity based on the second network slice selection information.

It is assumed that the first network slice selection information is S-NSSAI in a VPLMN, and the second network slice selection information is S-NSSAI in an HPLMN. After receiving the first message sent by the UE, the AMF entity determines a V-SMF entity, namely, the first SMF entity, based on the S-NSSAI in the VPLMN, and determines an H-SMF entity, namely, the second SMF entity, based on the S-NSSAI in the HPLMN. Then, the V-SMF entity selects a V-UPF entity, and the H-SMF entity selects an H-UPF entity, to continue session establishment. Finally, the AMF entity sends a second message to the UE. The second message includes second information, and the second information includes PDU session establishment accept (PDU session establishment accept) information.

S203. The UE receives a second message sent by the AMF entity.

After the session establishment method in this embodiment of this application is used, the UE sends the S-NSSAI in the VPLMN and the S-NSSAI in the HPLMN to the AMF entity, so that the AMF entity can accurately determine S-NSSAI that should be used in the current VPLMN and S-NSSAI that should be used in the current HPLMN, to complete PDU session establishment, and therefore the UE can perform communication.

Optionally, in this embodiment of this application, the first network slice selection information may be S-NSSAI corresponding to a first application in a VPLMN, and the second network slice selection information may be S-NSSAI corresponding to the first application in an HPLMN.

The first application is any third-party application program app installed on the UE, for example, Facebook or QQ.

Optionally, in this embodiment of this application, the AMF entity sends the second message to the UE, where the second message includes the PDU session establishment accept information, and this step specifically includes the following steps:

The AMF entity sends a PDU session establishment response (PDU session establishment response) message to a RAN device.

The PDU session establishment response message includes the PDU session establishment accept information, a first tunnel identifier, and first address information.

The RAN device sends a radio resource control (radio resource control, RRC) message to the UE.

The RRC message includes the PDU session establishment accept information, to notify the UE that session establishment is accepted.

Optionally, in this embodiment of this application, as shown in FIG. 6A and FIG. 6B, after the AMF entity determines the first SMF entity based on the first network slice selection information, and determines the second SMF entity based on the second network slice selection information, the method may further include the following steps.

S204. The AMF entity sends a third message to the V-SMF entity.

The third message includes the PDU session establishment request message and address information of the H-SMF entity. In this embodiment of this application, the third message may be referred to as an N11 message or the like. A specific name of the third message is not limited in this embodiment of this application.

S205. The V-SMF entity determines a V-UPF entity based on the third message, and allocates, to a session that is being established, a first tunnel identifier and first address information that are at a V-UPF end and a second tunnel identifier and second address information that are at the V-UPF end.

The first tunnel identifier and the first address information are a tunnel identifier and address information that are at the V-UPF end and are used when a RAN device sends data to the V-UPF entity, namely, a tunnel identifier and address information that are at the V-UPF end and are of an uplink (from the RAN device to the V-UPF entity) N3 tunnel. The second tunnel identifier and the second address information are a tunnel identifier and address information that are at the V-UPF end and are used when the H-UPF entity sends data to the V-UPF entity, namely, a tunnel identifier and address information that are at the V-UPF end and are of a downlink (from the H-UPF entity to the V-UPF entity) N9 tunnel.

The V-SMF entity determines the V-UPF entity based on the PDU session establishment request message in the third message, and allocates the first tunnel identifier and the first address information that are at the V-UPF end and the second tunnel identifier and the second address information that are at the V-UPF end. The V-SMF entity sends a create session message to the V-UPF entity, and the create session (create session) message includes information such as a packet detection rule and a reporting rule.

S206. The V-UPF receives a create session message sent by the V-SMF entity.

After receiving the create session message sent by the V-SMF entity, the V-UPF entity saves the information in the create session message, and replies with a response message.

S207. The V-SMF entity sends a create session request (create session request) message to the H-SMF entity.

The create session request message includes the second tunnel identifier and the second address information, namely, the tunnel identifier and the address information that are at the V-UPF end and are used when the H-UPF entity transmits data to the V-UPF.

The V-SMF entity sends, based on the address information of the H-SMF entity included in the received third message sent by the AMF entity, the create session request message to the H-SMF entity corresponding to the address information of the H-SMF entity.

S208. The H-SMF entity determines an H-UPF entity based on the create session request message, and sends a create session message to the H-UPF entity.

The create session message includes the tunnel identifier and the address information that are the V-UPF end and are used when the H-UPF entity transmits data to the V-UPF, namely, the second tunnel identifier and the second address information.

After receiving the create session message, the H-UPF entity saves the information in the create session message, and replies with a response message.

S209. The H-SMF entity sends a create session response message to the V-SMF entity.

The create session response message includes a tunnel identifier and address information that are at an H-UPF end and that are allocated by the H-SMF entity to an uplink (from the V-UPF to the H-UPF) N9 tunnel.

The tunnel identifier and the address information that are at the H-UPF end and are of the uplink (from the V-UPF to the H-UPF) tunnel may be included in the create session response (create session response) message, namely, the H-SMF entity sends the create session response message to the V-SMF entity, and the create session response message includes the tunnel identifier and the address information that are at the H-UPF end and are of the uplink (from the V-UPF to the H-UPF) tunnel.

S210. The AMF entity receives a fourth message.

The fourth message is sent by the V-SMF entity to the AMF entity, and includes PDU session establishment accept (PDU session establishment accept) information, and the first tunnel identifier and the first address information, namely, the tunnel identifier and the address information that are at the V-UPF end and are of the uplink (from the RAN device to the V-UPF entity) data sending N3 tunnel. Namely, the fourth message includes the tunnel identifier and the address information that are at the V-UPF end and are of the uplink (from the RAN device to the V-UPF entity) data sending N3 tunnel.

Optionally, after the UE receives the second message sent by the AMF entity, the method further includes:

S211. An RAN device sends a PDU session establishment response message to the AMF entity.

The RAN device allocates a tunnel identifier and address information that are at a RAN end and are of a downlink (from the V-UPF entity to the RAN device) data sending N3 tunnel, and sends the tunnel identifier and the address information to the AMF entity.

The RAN device sends, to the AMF entity by using the PDU session establishment response message, the allocated tunnel identifier and address information that are at the RAN end and are of the downlink (from the V-UPF entity to the RAN device) data sending N3 tunnel.

S212. The AMF entity sends the PDU session establishment response message to the V-SMF entity.

The AMF entity needs to send, to the V-SMF entity, the received tunnel identifier and address information that are at the RAN end and are of the N3 tunnel used when the V-UPF entity sends data to the RAN device.

The AMF entity sends the PDU session establishment response message to the V-SMF entity, adds, into the PDU session establishment response message, the tunnel identifier and the address information that are at the RAN end and are of the N3 tunnel used when the V-UPF entity sends data to the RAN device, and sends the message to the V-SMF entity.

S213. The V-SMF entity sends a modify session (modify session) message to V-UPF.

The modify session message includes the tunnel identifier and the address information that are at the RAN end and are of the N3 tunnel used when the V-UPF entity sends data to the RAN device, and a tunnel identifier and address information that are at an H-UPF end and are of an N9 tunnel used when the V-UPF sends data to H-UPF.

S214. The V-SMF entity responds to the V-AMF entity, to complete PDU session establishment.

The V-SMF entity responds to the AMF entity, to complete PDU session establishment.

Figure 7A:
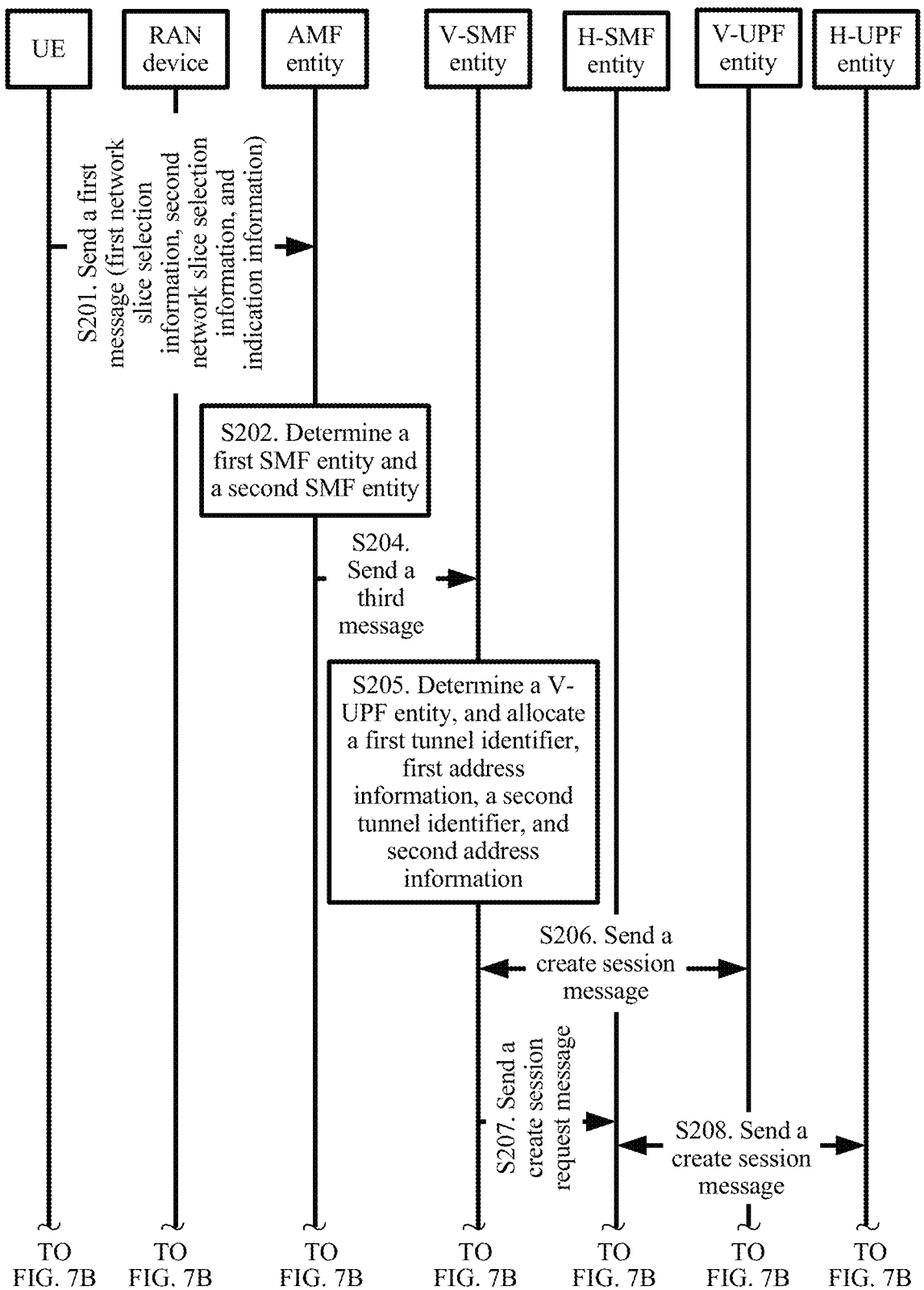
FIG. 7A and FIG. 7B are a flowchart of another session establishment method according to an embodiment of this application.
Figure 7B:
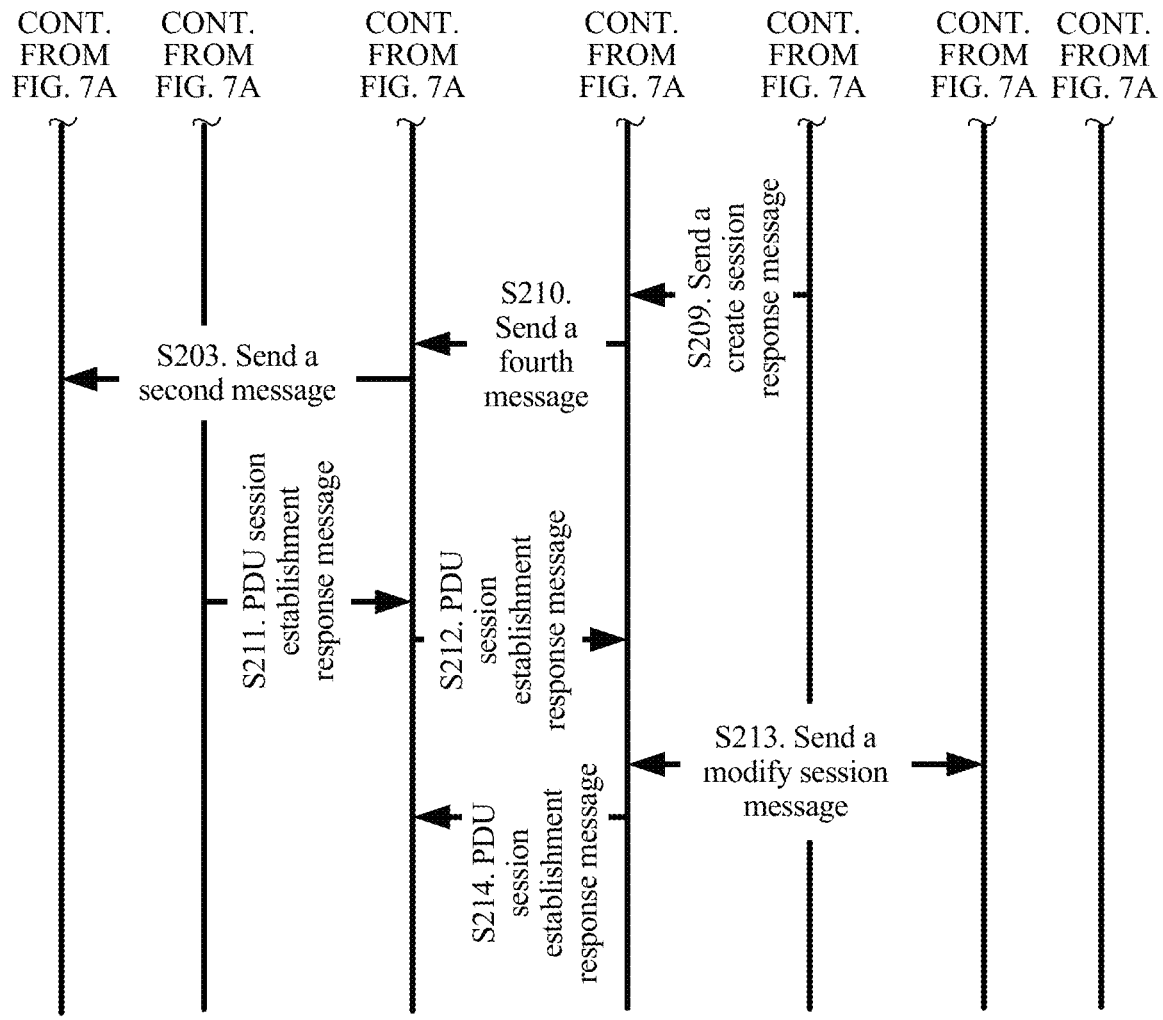

In another embodiment of this application, as shown in FIG. 7A and FIG. 7B, the first message in S201 may further include indication information. The indication information is used to indicate that the first network slice selection information is S-NSSAI in an HPLMN, or the indication information is used to indicate that the first network slice selection information is S-NSSAI in a VPLMN.

After receiving the first message sent by the UE, the AMF entity determines, based on a fact that the indication information indicates that the first network slice selection information is S-NSSAI corresponding to a VPLMN, that the second network slice selection information is S-NSSAI in an HPLMN, or the AMF entity determines, based on a fact that the indication information indicates that the first network slice selection information is S-NSSAI in an HPLMN, that the second network slice selection information is S-NSSAI in a VPLMN. In addition, the AMF entity determines corresponding SMF entities based on the first network slice selection information and the second network slice selection information, namely, the AMF entity selects a V-SMF entity based on the S-NSSAI of the UE in the VPLMN, and selects an H-SMF entity based on the S-NSSAI of the UE in the HPLMN, to complete session establishment. A specific session establishment process is the same as the method/steps in steps S204 to S214 in FIG. 6A and FIG. 6B. For brevity of description, details are not described herein again.

Optionally, the indication information may be used to indicate that the second network slice selection information is S-NSSAI in a VPLMN or S-NSSAI in an HPLMN. The AMF entity may determine, based on the indication information, that the first network slice selection information is S-NSSAI in an HPLMN or S-NSSAI corresponding to a VPLMN.

After the session establishment method provided in this embodiment of this application is used, the AMF entity may use the first network slice selection information, the second network slice selection information, and the indication information that are sent by the UE to the AMF entity, namely, the S-NSSAI corresponding to the VPLMN, the S-NSSAI in the HPLMN, and the information indicating S-NSSAI, to accurately determine the V-SMF entity and the H-SMF entity, to further complete session establishment. Therefore, the following case is avoided: In a process in which the UE establishes a PDU session, the AMF entity cannot determine corresponding S-NSSAI of the UE, and cannot complete PDU session establishment, and consequently the UE cannot perform communication.

Figure 8A:
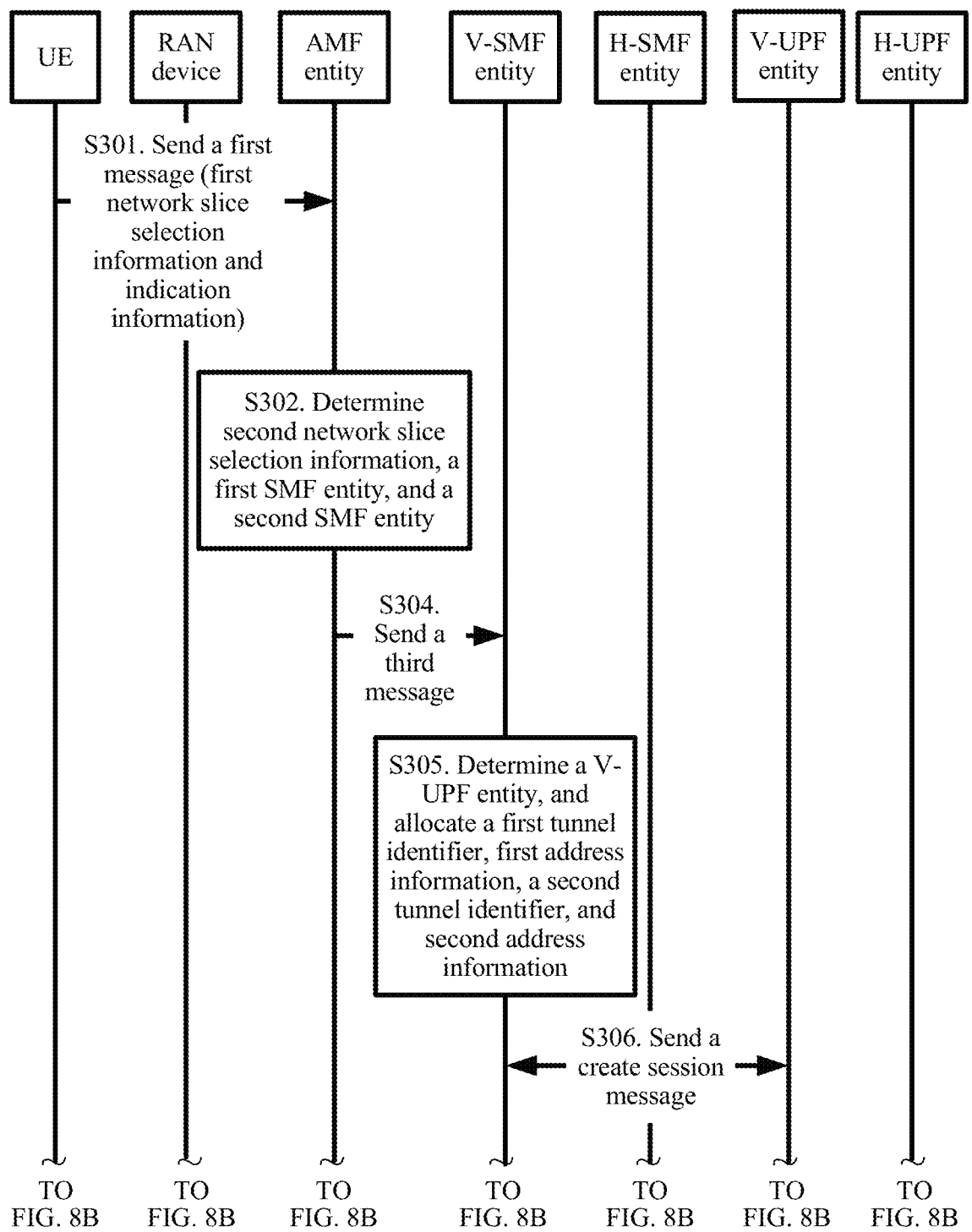
FIG. 8A and FIG. 8B are a flowchart of still another session establishment method according to an embodiment of this application.
Figure 8B:
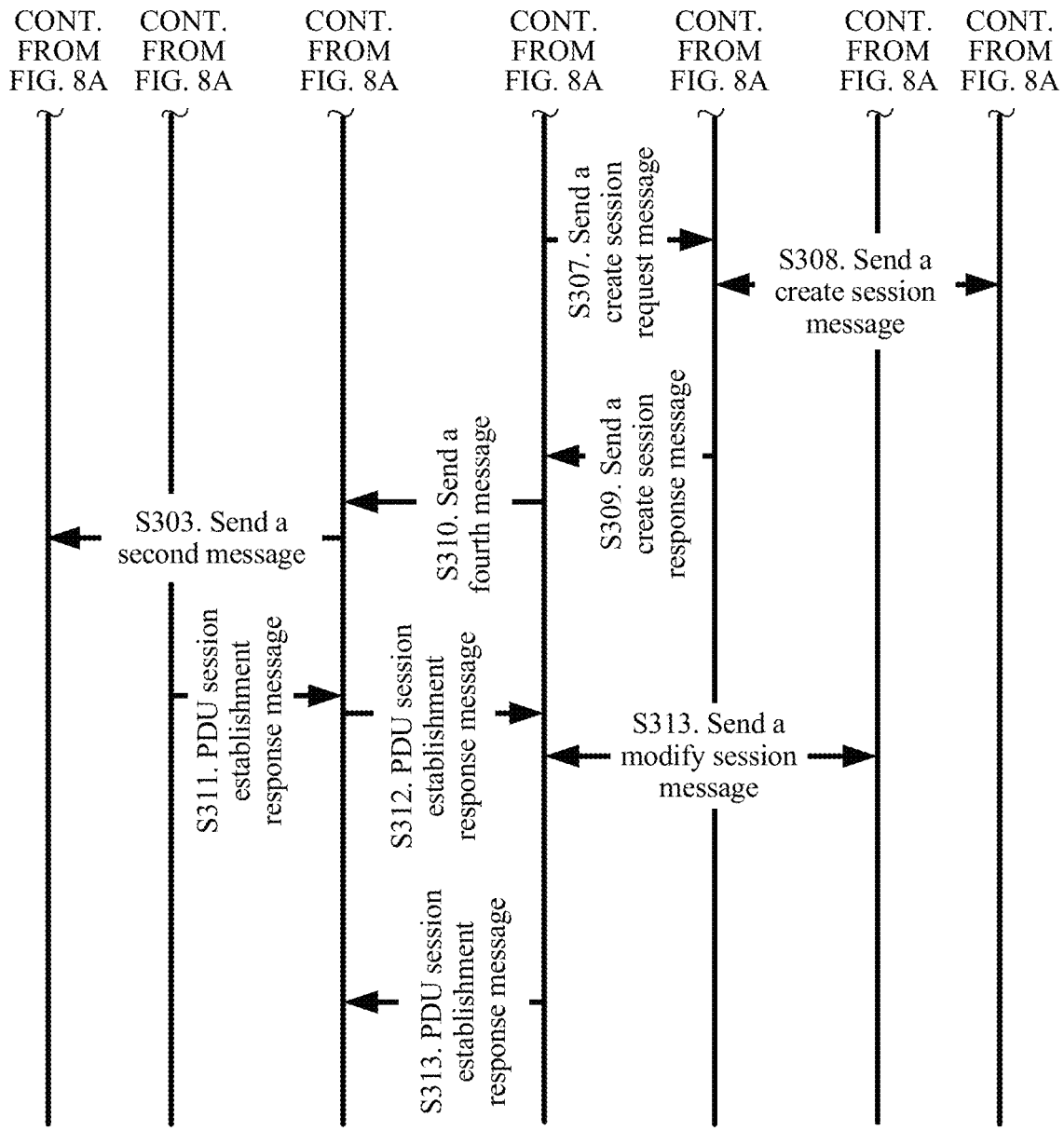

FIG. 8A and FIG. 8B show another session establishment method according to an embodiment of this application. As shown in FIG. 8A and FIG. 8B, the method may include the following steps.

S301. UE sends a first message to an AMF entity.

During session establishment, the UE needs to initiate the first message to the AMF entity. The first message includes first information, network slice selection information (first network slice selection information), and indication information.

The first information includes information for requesting to establish a PDU session. In this embodiment of this application, the first information may be a message, for example, a PDU session establishment request message.

The first network slice selection information is used by the AMF entity to select an SMF entity. The indication information is used to indicate that the first network slice selection information is S-NSSAI of the UE in a VPLMN, or is used to indicate that the first network slice selection information is S-NSSAI of the UE in an HPLMN.

S302. The AMF entity determines, based on indication information, that first network slice selection information is S-NSSAI of the UE in a VPLMN or first network slice selection information is S-NSSAI of the UE in an HPLMN, determines a first SMF entity based on the first network slice selection information, determines second network slice selection information based on the first network slice selection information and information about a correspondence between VPLMN S-NSSAI and HPLMN S-NSSAI, and selects a second SMF entity based on the second network slice selection information.

It should be noted that, in this embodiment of this application, the information about the correspondence between VPLMN S-NSSAI and HPLMN S-NSSAI may be information about a one-to-one correspondence that is between VPLMN S-NSSAI and HPLMN S-NSSAI and that is defined according to a roaming protocol, or may be information about a one-to-many correspondence that is between VPLMN S-NSSAI and HPLMN S-NSSAI and that is defined according to a roaming protocol.

When there is a one-to-one correspondence between VPLMN S-NSSAI and HPLMN S-NSSAI, for example, if AMF entity pre-stores a table of a one-to-one mapping relationship between VPLMN S-NSSAI and HPLMN S-NSSAI, when the first network slice selection information is S-NSSAI in a VPLMN, the AMF entity may determine S-NSSAI in an HPLMN by using the mapping relationship table, and use the S-NSSAI as the second network slice selection information. When there is a one-to-many correspondence between VPLMN S-NSSAI and HPLMN S-NSSAI, for example, if one piece of VPLMN S-NSSAI is corresponding to a plurality of pieces of HPLMN S-NSSAI, when the first network slice selection information is S-NSSAI in a VPLMN, the AMF entity may select one piece of HPLMN S-NSSAI based on a sequence of priorities of the plurality of pieces of HPLMN S-NSSAI that are corresponding to the VPLMN S-NSSAI, to further complete PDU session establishment.

Optionally, the AMF entity may further select, based on a session attribute, HPLMN S-NSSAI corresponding to VPLMN S-NSSAI. For example, the AMF entity selects, based on a session type in a session attribute of the VPLMN S-NSSAI, HPLMN S-NSSAI whose session type is consistent with the session type in the session attribute.

After determining the first SMF entity and the second SMF entity, the AMF entity further completes session establishment, and sends a second message to the UE. The second message includes second information, and the second information includes PDU session establishment accept information.

S303. The UE receives a second message.

After the session establishment method in this embodiment of this application is used, the UE sends, to the AMF entity, the S-NSSAI and the information indicating that the S-NSSAI is the S-NSSAI of the UE in the VPLMN or the HPLMN, so that the AMF accurately determines a V-SMF entity and an H-SMF entity based on the message sent by the UE and the information about the correspondence between VPLMN S-NSSAI and HPLMN S-NSSAI, to further complete session establishment.

Optionally, in this embodiment of this application, the first network slice selection information is S-NSSAI corresponding to a first application. The first application is a third-party application program installed on the UE, for example, QQ or Facebook.

In this embodiment of this application, the AMF entity determines the S-NSSAI corresponding to the VPLMN and the S-NSSAI corresponding to the HPLMN, and selects the V-SMF entity based on the S-NSSAI in the VPLMN and selects the H-SMF entity based on the S-NSSAI in the HPLMN, to complete session establishment. A specific session establishment process in steps S304 to S314 is the same as the method/steps in steps S204 to S214 in FIG. 6A and FIG. 6B. For brevity of description, details are not described herein again.

Optionally, in this embodiment of this application, before the UE sends the first message to the AMF entity, the method further includes:

determining, by the UE, the network slice selection information, namely, the first network slice selection information.

A specific process of the foregoing step may include: if S-NSSAI corresponding to the first application exists in a network slice selection policy in the visited public land mobile network VPLMN, determining, by the UE, the S-NSSAI as the first network slice selection information; or if S-NSSAI corresponding to the first application exists in a network slice selection policy in the home public land mobile network HPLMN, determining, by the UE, the S-NSSAI as the first network slice selection information.

The foregoing describes processes of the registration method and the session establishment method. With reference to FIG. 9 to FIG. 14, the following describes in detail the terminal and the AMF that are provided in the embodiments of this application. It should be noted that, the terminal in the embodiments of this application may be referred to as UE.

Figure 9:
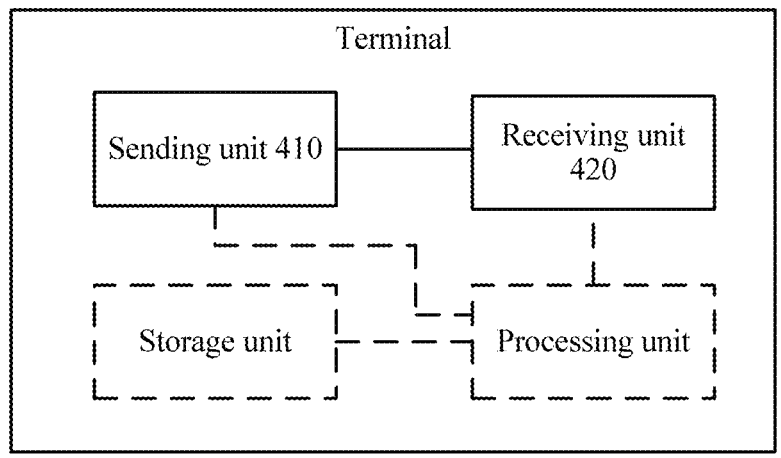
FIG. 9 is a schematic structural diagram of a terminal according to an embodiment of this application.

FIG. 9 is a schematic structural diagram of a terminal according to an embodiment of this application. As shown in FIG. 9, the terminal may include a sending unit 410 and a receiving unit 420.

When the terminal roams from a home network to a visited PLMN, the terminal needs to perform network registration. In a registration process, the sending unit 410 sends a registration request message to an access and mobility management function AMF entity, and the registration request message includes a first parameter that is used to request a network slice selection policy. In this embodiment of this application, the first parameter may be need NSSP indication information.

After receiving the registration request message sent by the terminal, the AMF entity obtains network slice selection information based on the first parameter in the registration request message, and sends a registration accept message to the terminal. The registration accept message includes the network slice selection information. Therefore, when establishing a PDU session, the terminal can accurately select, based on the network slice selection policy, S-NSSAI in a VPLMN or an HPLMN in which the terminal is located, to further complete PDU session establishment.

Optionally, in this embodiment of this application, the terminal may further include a processing unit, configured to process related data.

Figure 10:
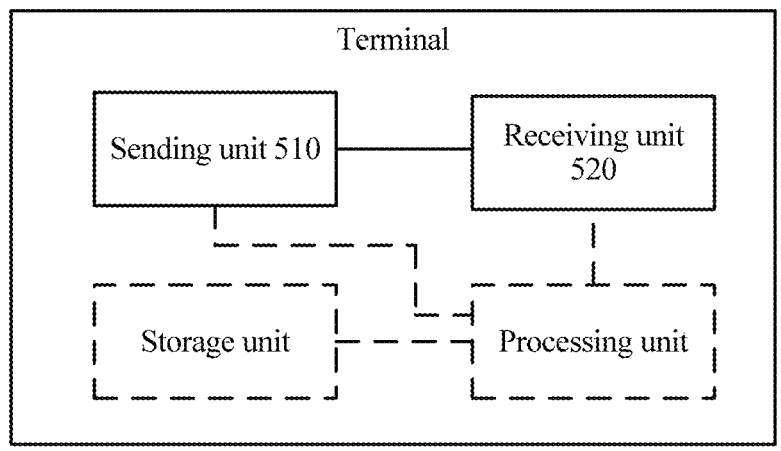
FIG. 10 is a schematic structural diagram of another terminal according to an embodiment of this application.

FIG. 10 is a schematic structural diagram of a terminal according to an embodiment of this application. As shown in FIG. 10, the terminal may include a sending unit 510 and a receiving unit 520.

The sending unit 510 is configured to a first message to an access and mobility management function AMF entity, where the first message includes first information, first network slice selection information, and second network slice selection information.

The first information includes information for requesting to establish a protocol data unit PDU session. In this embodiment of this application, the first information may be a message, for example, a PDU session establishment request message.

The first network slice selection information is used by the AMF entity to select a first session management control function SMF entity, and the second network slice selection information is used by the AMF entity to select a second SMF entity. For example, if the first network slice selection information is S-NSSAI of the terminal (or referred to as UE) in a VPLMN, and the second network slice selection information is S-NSSAI of the terminal (or referred to as UE) in an HPLMN, the AMF selects a V-SMF entity, namely, the first SMF entity, based on the S-NSSAI in the VPLMN, and the AMF entity selects an H-SMF entity, namely, the second SMF entity, based on the S-NSSAI in the HPLMN.

The receiving unit 520 is configured to receive a second message sent by the AMF entity, where the second message includes second information, and the second information includes PDU session establishment accept information.

After the terminal provided in this embodiment of this application is used, the terminal sends the S-NSSAI of the terminal in the VPLMN and the S-NSSAI of the terminal in the HPLMN to the AMF entity, so that the AMF accurately determines the V-SMF entity and the H-SMF entity based on the two pieces of S-NSSAI, to further complete PDU session establishment.

Optionally, in an embodiment of this application, the first network slice selection information is S-NSSAI corresponding to a first application in a VPLMN, and the second network slice selection information is S-NSSAI corresponding to the first application in an HPLMN. The first application is a third-party application installed on the terminal, for example, QQ or Facebook.

Optionally, in another embodiment of this application, the first message may further include indication information, where the indication information is used to indicate that the first network slice selection information is S-NSSAI in an HPLMN, or the indication information is used to indicate that the first network slice selection information is S-NSSAI in a VPLMN.

In this embodiment of this application, the first message includes two pieces of S-NSSAI, and the indication information indicates one of the two pieces of S-NSSAI is S-NSSAI of the terminal in a VPLMN or S-NSSAI of the terminal in an HPLMN. After receiving the first message, the AMF entity determines, based on the indication information in the first message, one of the two pieces of S-NSSAI is S-NSSAI of the terminal in a VPLMN, and the other piece of S-NSSAI is S-NSSAI of the terminal in an HPLMN, and selects the V-SMF entity based on the S-NSSAI in the VPLMN and selects the H-SMF entity based on the S-NSSAI in the HPLMN, to further complete PDU session establishment.

In addition, the terminal in this embodiment of this application may further include a processing unit, configured to perform related processing on data.

It should be noted that, in the embodiments of this application, the terminal provided in FIG. 10 and the terminal provided in FIG. 9 may be a same terminal, namely, the sending unit 510 and the receiving unit 520 in FIG. 10 may be the sending unit 410 and the receiving unit 420 in FIG. 9.

Figure 11:
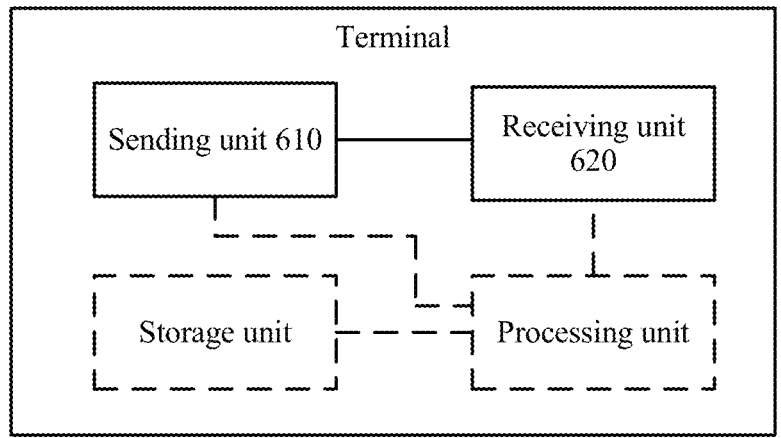
FIG. 11 is a schematic structural diagram of still another terminal according to an embodiment of this application.

FIG. 11 shows a terminal according to an embodiment of this application. As shown in FIG. 11, the terminal may include a sending unit 610 and a receiving unit 620.

The sending unit 610 is configured to a first message to an access and mobility network management function AMF entity, where the first message includes first information, network slice selection information, and indication information.

The first information includes information for requesting to establish a protocol data unit PDU session. In this embodiment of this application, the first information may be a message, for example, the first information is a PDU session establishment request message.

The network slice selection information is used by the AMF entity to select a session management control function SMF entity. The indication information is used to indicate that the network slice selection information is single network slice selection assistance information S-NSSAI in a visited public land mobile network VPLMN, or is used to indicate that the network slice selection information is S-NSSAI in a home public land mobile network HPLMN.

Therefore, the AMF entity determines, based on the indication information, that the network slice selection information is the S-NSSAI of the terminal in the VPLMN or the S-NSSAI of the terminal in the HPLMN, and further determines, based on the network slice selection information, S-NSSAI of the terminal in an HPLMN or S-NSSAI of the terminal in a V-PLMN, and selects a V-SMF entity and an H-SMF entity.

The receiving unit 620 is configured to receive a second message sent by the AMF entity, where the second message includes second information, and the second information includes PDU session establishment accept information, to complete PDU session establishment.

Optionally, in this embodiment of this application, the network slice selection information is S-NSSAI corresponding to a first application. The first application is a third-party application program installed on the terminal, for example, QQ, Facebook, or email.

Optionally, in this embodiment of this application, the terminal may further include a processing unit 630. Before the terminal sends the first message to the AMF entity, the processing unit 630 further needs to determine the network slice selection information.

For example, the processing unit 630 performs the following processing: if S-NSSAI corresponding to the first application exists in a network slice selection policy in the VPLMN, determining the S-NSSAI as the network slice selection information; or if S-NSSAI corresponding to the first application exists in a network slice selection policy in the HPLMN, determining the S-NSSAI as the network slice selection information.

It should be noted that, the terminal provided in FIG. 11 and the terminal provided in FIG. 9 may be a same terminal, namely, the sending unit 610 and the receiving unit 620 in FIG. 11 are the sending unit 410 and the receiving unit 420 in FIG. 9.

Figure 12:
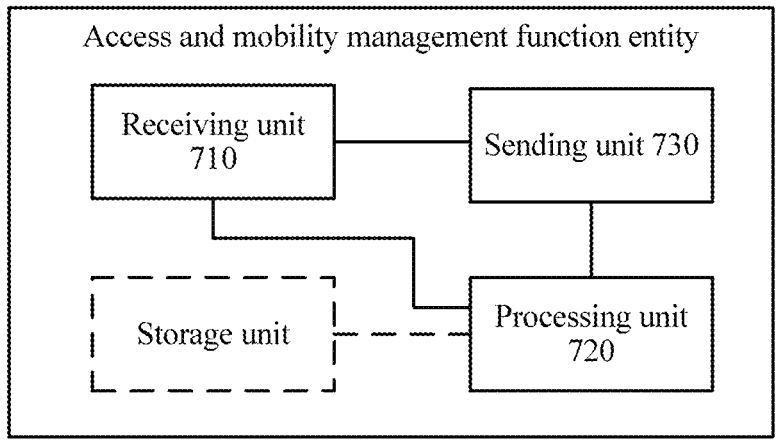
FIG. 12 is a schematic structural diagram of an access and mobility management function entity according to an embodiment of this application.

FIG. 12 is a schematic structural diagram of an access and mobility management function entity according to an embodiment of this application. As shown in FIG. 12, the access and mobility management function AMF entity may include a receiving unit 710, a processing unit 720, and a sending unit 730.

The receiving unit 710 is configured to receive a registration request message sent by a terminal. The registration request message includes a first parameter, and the first parameter is used to request a network slice selection policy NSSP. In this embodiment of this application, the first parameter may be need NSSP indication information.

The processing unit 720 is configured to obtain a network slice selection policy based on the registration request message.

Optionally, in an embodiment of this application, the AMF entity may obtain the NSSP of the terminal from a PCF entity.

For example, the sending unit 730 of the AMF entity sends a UE context establishment request message to the PCF entity, and the message includes the first parameter and UE identifier information, such as an IMSI. The PCF entity sends a UE context establishment response message to the AMF entity based on the request from the AMF, and the message includes the NSSP of the UE and the UE identifier information.

The sending unit 730 is configured to send a registration accept message to the terminal. The registration accept message includes the network slice selection policy. In this way, in a process in which the terminal establishes a PDU session, the AMF entity can accurately determine, based on the NSSP of the terminal, S-NSSAI in a VPLMN or an HPLMN in which the terminal is located, to further complete PDU session establishment.

Figure 13:
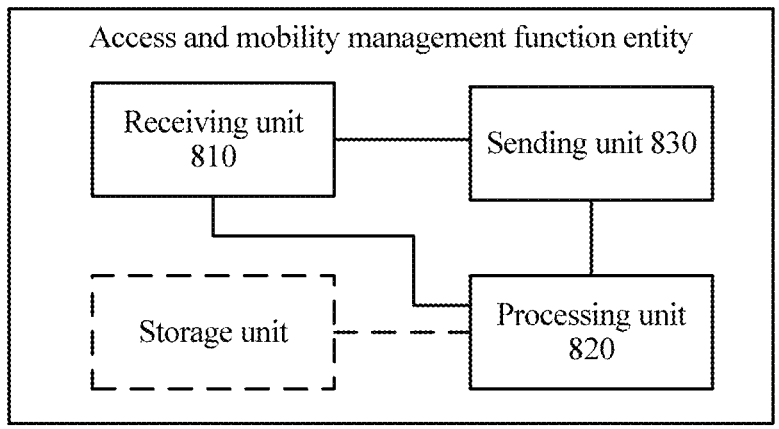
FIG. 13 is a schematic structural diagram of another access and mobility management function entity according to an embodiment of this application.

FIG. 13 is a schematic structural diagram of an access and mobility management function entity according to an embodiment of this application. As shown in FIG. 13, the access and mobility management function AMF entity may include a receiving unit 810, a processing unit 820, and a sending unit 830.

The receiving unit 810 is configured to receive a first message sent by a terminal. The first message includes first information, first network slice selection information, and second network slice selection information.

The first information includes information for requesting to establish a protocol data unit PDU session. In this embodiment of this application, the first information may be a message, for example, the first information is a PDU session establishment request message.

The processing unit 820 is configured to: determine a first session management control function SMF entity based on the first network slice selection information, and determine a second SMF entity based on the second network slice selection information.

For example, if the first network slice selection information is S-NSSAI of the terminal in a VPLMN, and the second network slice selection information is S-NSSAI of the terminal in an HPLMN, the AMF selects a V-SMF entity, namely, the first SMF entity, based on the S-NSSAI in the VPLMN, and the AMF entity selects an H-SMF entity, namely, the second SMF entity, based on the S-NSSAI in the HPLMN.

The sending unit 830 is configured to send a second message to the terminal, where the second message includes second information, and the second information includes PDU session establishment accept information, to complete PDU session establishment.

Optionally, in this embodiment of this application, the first network slice selection information is S-NSSAI corresponding to a first application in a VPLMN, and the second network slice selection information is S-NSSAI corresponding to the first application in an HPLMN. The first application is a third-party application program installed on the terminal, for example, email, QQ, or Facebook.

Optionally, in an embodiment of this application, the first message may further include indication information that is used to indicate that the first network slice selection information is S-NSSAI in an HPLMN or the first network slice selection information is S-NSSAI in a VPLMN. After receiving the first message, the AMF entity determines, based on the indication information in the first message, that each of the first network slice selection information and the second network slice selection information that are included in the first message is S-NSSAI of the terminal in a VPLMN or S-NSSAI of the terminal in an HPLMN. If the AMF entity determines, based on the indication information, that the first network slice selection information is S-NSSAI in a VPLMN, the AMF entity determines that the second network slice selection information is S-NSSAI in an HPLMN, and selects the H-SMF entity based on the S-NSSAI in the HPLMN and selects the V-SMF entity based on the S-NSSAI in the VPLMN, to further complete session establishment.

It should be noted that, the AMF entity provided in FIG. 13 and the AMF entity provided in FIG. 12 may be a same device, namely, the receiving unit 810, the processing unit 820, and the sending unit 830 in FIG. 13 may be the receiving unit 710, the processing unit 720, and the sending unit 730 in FIG. 12.

Figure 14:
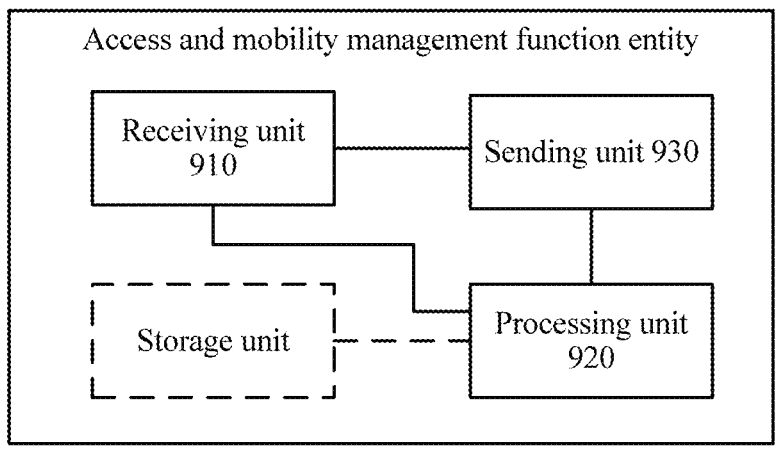
FIG. 14 is a schematic structural diagram of still another access and mobility management function entity according to an embodiment of this application.

FIG. 14 is a schematic structural diagram of another access and mobility management function entity according to an embodiment of this application. As shown in FIG. 14, the access and mobility management function AMF entity may include a receiving unit 910, a processing unit 920, and a sending unit 930.

The receiving unit 910 is configured to receive a first message sent by a terminal. The first message includes first information, first network slice selection information, and indication information.

The first information includes information for requesting to establish a protocol data unit PDU session. In this embodiment of this application, the first information may be a message, for example, the first information is a PDU session establishment request message.

The indication information is used to indicate that the first network slice selection information is single network slice selection assistance information S-NSSAI of the terminal in a visited public land mobile network VPLMN, or is used to indicate that the network slice selection information is S-NSSAI of the terminal in a home public land mobile network HPLMN.

The processing unit 920 is configured to: determine, based on the indication information, that the first network slice selection information is the single network slice selection assistance information S-NSSAI of the terminal in the VPLMN or the first network slice selection information is the S-NSSAI of the terminal in the HPLMN, select a first session management control function SMF entity based on the first network slice selection information, determine second network slice selection information based on the first network slice selection information and information about a correspondence between VPLMN S-NSSAI and HPLMN S-NSSAI, and select a second SMF entity based on the second network slice selection information.

The sending unit 930 is configured to send a second message to the terminal, where the second message includes second information, and the second information includes PDU session establishment accept information, to complete PDU session establishment.

Optionally, in this embodiment of this application, the first network slice selection information is S-NSSAI corresponding to a first application.

The first application is a third-party application program installed on the terminal, for example, QQ, Facebook, or email.

It should be noted that, the AMF entity provided in FIG. 14 and the AMF entity provided in FIG. 13 may be a same device, namely, the receiving unit 910, the processing unit 920, and the sending unit 930 in FIG. 14 may be the receiving unit 810, the processing unit 820, and the sending unit 830 in FIG. 13.

In addition, the terminal provided in FIG. 9 to FIG. 11 may further include a storage unit, and the AMF entity provided in FIG. 12 to FIG. 14 may further include a storage unit, where the storage unit is configured to store a related instruction and related data.

It should further be noted that, in a process in which the terminal establishes a PDU session, after the AMF entity receives the first message sent by the terminal, namely, after the AMF entity receives the PDU session establishment request information, the AMF entity selects the V-SMF entity and the H-SMF entity based on the information included in the first message, for example, the information included in the first message in FIG. 10, FIG. 11, FIG. 13, or FIG. 14, to complete PDU session establishment. A process thereof is the same as the method/steps in steps S204 to S214 in FIG. 6A and FIG. 6B. For brevity of description, details are not described herein again.

Figure 15:
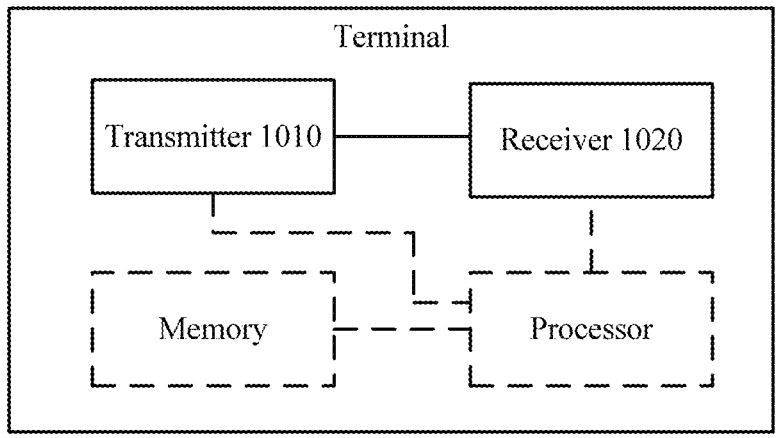
FIG. 15 is a schematic structural diagram of a terminal according to an embodiment of this application.

FIG. 15 shows a terminal according to an embodiment of this application. As shown in FIG. 15, the terminal may include a transmitter 1010 and a receiver 1020.

The transmitter 1010 is configured to send a registration request message to an access and mobility management function AMF entity, where the registration request message includes a first parameter, and the first parameter is used to request a network slice selection policy.

The receiver 1020 is configured to receive a registration accept message sent by the AMF entity, where the registration accept message includes the network slice selection policy, so that in a process in which the terminal subsequently establishes a PDU session, the terminal can accurately determine corresponding S-NSSAI based on an NSSP in a current VPLMN or HPLMN, and the following case is avoided: When the terminal establishes a PDU session, the AMF entity cannot find S-NSSAI corresponding to a network in which the terminal is located, and cannot complete PDU session establishment, and consequently the terminal cannot perform communication.

Optionally, in this embodiment of this application, the terminal may further include a processor and a memory. The processor is configured to perform corresponding data processing by invoking an instruction from the memory. The memory is configured to store a corresponding instruction and corresponding data.

Figure 16:
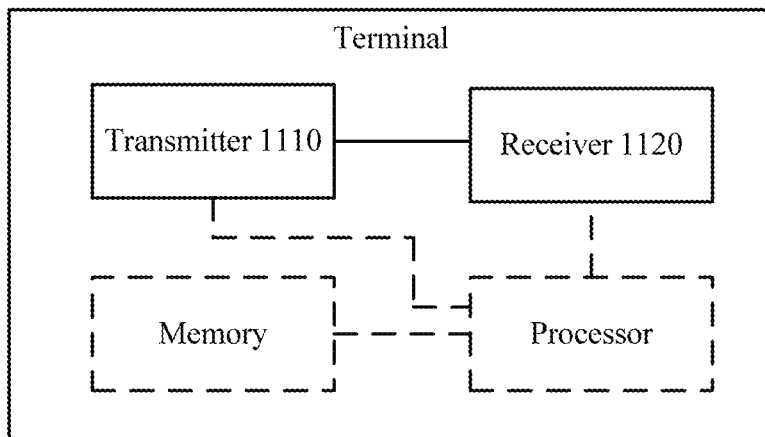
FIG. 16 is a schematic structural diagram of another terminal according to an embodiment of this application.

FIG. 16 shows a terminal according to an embodiment of this application. As shown in FIG. 16, the terminal may include a transmitter 1110 and a receiver 1120.

The transmitter 1110 is configured to send a first message to an access and mobility management function AMF entity, where the first message includes first information, first network slice selection information, and second network slice selection information, the first information includes information for requesting to establish a protocol data unit PDU session, the first network slice selection information is used by the AMF entity to select a first session management control function SMF entity, and the second network slice selection information is used by the AMF entity to select a second SMF entity.

The receiver 1120 is configured to receive a second message sent by the AMF entity, where the second message includes second information, and the second information includes PDU session establishment accept information.

After the terminal provided in this embodiment of this application is used, in a PDU session establishment process, the AMF entity can accurately determine S-NSSAI, to complete PDU session establishment. The following case is avoided: When the terminal establishes a PDU session, the AMF entity cannot find S-NSSAI corresponding to a network in which the terminal is located, and cannot complete PDU session establishment, and consequently the terminal cannot perform communication.

Optionally, in an embodiment of this application, the first network slice selection information may be single network slice selection assistance information S-NSSAI corresponding to a first application in a visited public land mobile network VPLMN, and the second network slice selection information is S-NSSAI corresponding to the first application in a home public land mobile network HPLMN.

Optionally, in another embodiment of this application, the first message further includes indication information, where the indication information is used to indicate that the first network slice selection information is single network slice selection assistance information S-NSSAI in a visited public land mobile network VPLMN, or the indication information is used to indicate that the first network slice selection information is S-NSSAI in a home public land mobile network HPLMN. Therefore, after receiving the first message, the AMF entity determines the first network slice selection information and the second network slice selection information based on the indication information in the first message, to further complete PDU session establishment.

In addition, optionally, the terminal provided in this embodiment of this application may further include a processor and a memory. The memory is configured to store a corresponding instruction and corresponding data, so that the processor invokes the instruction from the memory and performs corresponding processing on data.

Figure 17:
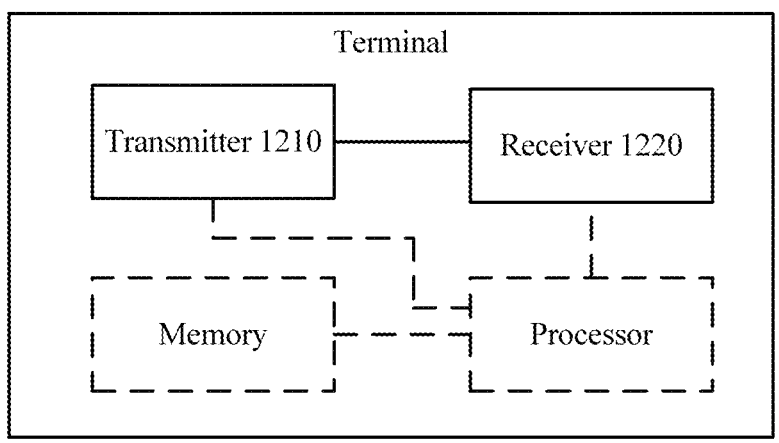
FIG. 17 is a schematic structural diagram of still another terminal according to an embodiment of this application.

FIG. 17 shows a terminal according to an embodiment of this application. As shown in FIG. 17, the terminal may include a transmitter 1210 and a receiver 1220.

The transmitter 1210 is configured to send a first message to an access and mobility network management function AMF entity, where the first message includes first information, network slice selection information, and indication information, the first information includes information for requesting to establish a protocol data unit PDU session, the network slice selection information is used by the AMF entity to select a session management control function SMF entity, and the indication information is used to indicate that the network slice selection information is single network slice selection assistance information S-NSSAI of the terminal in a visited public land mobile network VPLMN, or is used to indicate that the network slice selection information is S-NSSAI of the terminal in a home public land mobile network HPLMN.

The receiver 1220 is configured to receive a second message sent by the AMF entity, where the second message includes second information, and the second information includes PDU session establishment accept information.

After the terminal provided in this embodiment of this application is used, in a PDU session establishment process, the AMF entity can accurately determine S-NSSAI, to complete PDU session establishment. The following case is avoided: When the terminal establishes a PDU session, the AMF entity cannot find S-NSSAI corresponding to a network in which the terminal is located, and cannot complete PDU session establishment, and consequently the terminal cannot perform communication.

Optionally, in an embodiment of this application, the network slice selection information is S-NSSAI corresponding to a first application.

Optionally, in another embodiment of this application, the terminal further includes a processor 1230, configured to determine the network slice selection information.

Optionally, in an embodiment, that the processor 1230 determines the network slice selection information includes:

if S-NSSAI corresponding to the first application exists in a network slice selection policy in the visited public land mobile network VPLMN, determining, by the terminal, the S-NSSAI as the network slice selection information; or if S-NSSAI corresponding to the first application exists in a network slice selection policy in the home public land mobile network HPLMN, determining, by the terminal, the S-NSSAI as the network slice selection information.

Similarly, optionally, the terminal provided in this embodiment of this application may further include a processor and a memory. The memory is configured to store a corresponding instruction and corresponding data, so that the processor invokes the instruction from the memory and performs corresponding processing on data.

Figure 18:
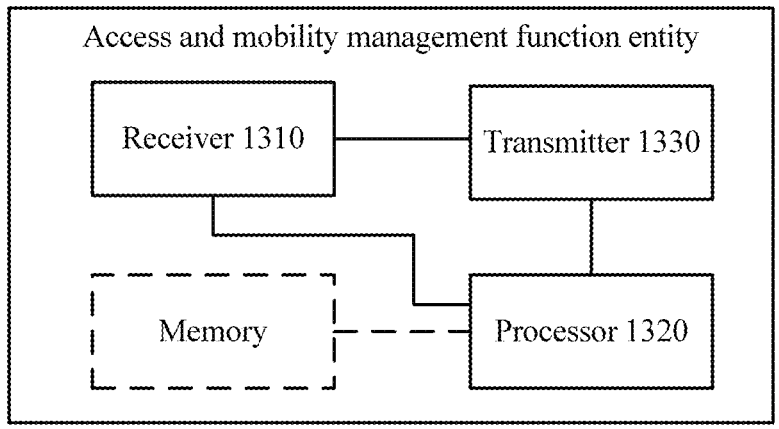
FIG. 18 is a schematic structural diagram of an access and mobility management function entity according to an embodiment of this application.

FIG. 18 shows an access and mobility management function AMF entity according to an embodiment of this application. As shown in FIG. 18, the AMF entity may include a receiver 1310, a processor 1320, and a transmitter 1330.

The receiver 1310 is configured to receive a registration request message sent by a terminal, where the registration request message includes a first parameter, and the first parameter is used to request a network slice selection policy.

The processor 1320 is configured to obtain a network slice selection policy based on the registration request message.

The transmitter 1330 is configured to send a registration accept message to the terminal, where the registration accept message includes the network slice selection policy.

A network slice selection policy in a network in which the terminal is located is obtained by using the first parameter sent by the terminal to the AMF entity, so that when a PDU session is subsequently established, corresponding S-NSSAI is accurately determined based on the network slice selection policy, and the following case is avoided: When the terminal establishes a PDU session, the AMF entity cannot find S-NSSAI corresponding to the network in which the terminal is located, and cannot complete PDU session establishment, and consequently the terminal cannot perform communication.

Optionally, in an embodiment of this application, that the processor obtains a network slice selection policy based on the registration request message includes:

sending, by the transmitter 1330, a first message to a policy control function PCF entity, where the first message includes the first parameter; and receiving, by the receiver 1310, a second message sent by the PCF entity, where the second message includes the network slice selection policy.

Optionally, the AMF provided in this embodiment of this application may further include a memory. The memory is configured to store a corresponding instruction and corresponding data, so that the processor invokes the instruction from the memory and performs corresponding processing on data.

Figure 19:
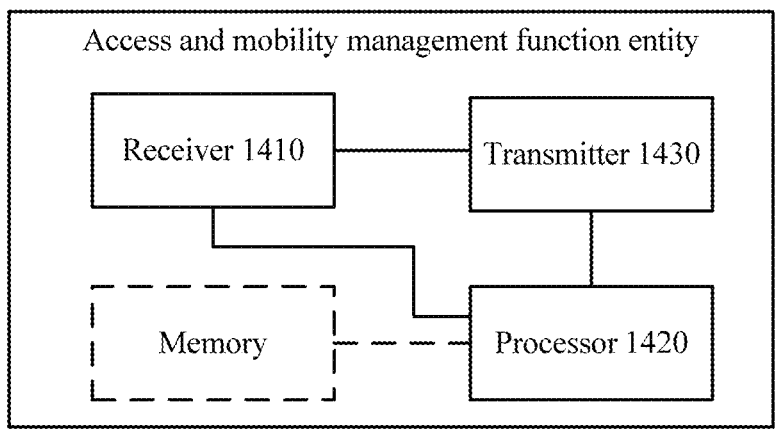
FIG. 19 is a schematic structural diagram of another access and mobility management function entity according to an embodiment of this application.

FIG. 19 shows an access and mobility management function AMF entity according to an embodiment of this application. As shown in FIG. 19, the AMF entity may include a receiver 1410, a processor 1420, and a receiver 1430.

The receiver 1410 is configured to receive a first message sent by a terminal, where the first message includes first information, first network slice selection information, and second network slice selection information, and the first information includes information for requesting to establish a protocol data unit PDU session.

The processor 1420 is configured to: determine a first session management control function SMF entity based on the first network slice selection information, and determine a second SMF entity based on the second network slice selection information.

The transmitter 1430 is configured to send a second message to the terminal, where the second message includes second information, and the second information includes PDU session establishment accept information.

In this way, in a process in which the terminal subsequently establishes a PDU session, the terminal can accurately determine corresponding S-NSSAI based on an NSSP in a current VPLMN or HPLMN, and the following case is avoided: When the terminal establishes a PDU session, the AMF entity cannot find S-NSSAI corresponding to a network in which the terminal is located, and cannot complete PDU session establishment, and consequently the terminal cannot perform communication.

Optionally, in an embodiment of this application, the first network slice selection information is single network slice selection assistance information S-NSSAI corresponding to a first application in a visited public land mobile network VPLMN, and the second network slice selection information is S-NSSAI corresponding to the first application in a home public land mobile network HPLMN.

In another embodiment of this application, the first message further includes indication information, where the indication information is used to indicate that the first network slice selection information is single network slice selection assistance information S-NSSAI in a visited public land mobile network VPLMN, or the indication information is used to indicate that the first network slice selection information is S-NSSAI in a home public land mobile network HPLMN. Therefore, after receiving the first message, the AMF entity determines the first network slice selection information and the second network slice selection information based on the indication information in the first message, to further complete PDU session establishment.

In addition, optionally, the AMF entity provided in this embodiment of this application may further include a memory. The memory is configured to store a corresponding instruction and corresponding data, so that the processor invokes the instruction from the memory and performs corresponding processing on data.

Figure 20:
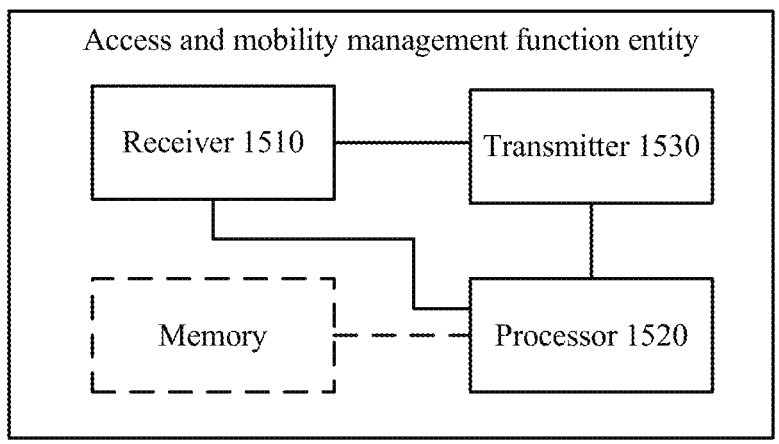
FIG. 20 is a schematic structural diagram of still another access and mobility management function entity according to an embodiment of this application.

FIG. 20 shows an access and mobility management function AMF entity according to an embodiment of this application. As shown in FIG. 20, the AMF entity may include a receiver 1510, a processor 1520, and a transmitter 1530.

The receiver 1510 is configured to receive a first message sent by a terminal, where the first message includes first information, first network slice selection information, and indication information, the first information includes information for requesting to establish a protocol data unit PDU session, and the indication information is used to indicate that the first network slice selection information is single network slice selection assistance information S-NSSAI of the terminal in a visited public land mobile network VPLMN, or is used to indicate that the network slice selection information is S-NSSAI of the terminal in a home public land mobile network HPLMN.

The processor 1520 is configured to: determine, based on the indication information, that the first network slice selection information is the single network slice selection assistance information S-NSSAI of the terminal in the VPLMN or the first network slice selection information is the S-NSSAI of the terminal in the HPLMN, select a first session management control function SMF entity based on the first network slice selection information, determine second network slice selection information based on the first network slice selection information and information about a correspondence between VPLMN S-NSSAI and HPLMN S-NSSAI, and select a second SMF entity based on the second network slice selection information.

The transmitter 1530 is configured to send a second message to the terminal, where the second message includes second information, and the second information includes PDU session establishment accept information.

After the solution provided in this embodiment of this application is used, the AMF entity can accurately determine to-be-used S-NSSAI based on the first network slice selection information and the indication information, to complete PDU session establishment.

In an embodiment of this application, the first network slice selection information is S-NSSAI corresponding to a first application.

In addition, the AMF entity provided in this embodiment of this application may further include a processor and a memory. The memory is configured to store a corresponding instruction and corresponding data, so that the processor invokes the instruction from the memory and performs corresponding processing on data.

An embodiment of this application provides a computer program product including an instruction, and when the instruction runs on a computer, the methods/steps in FIG. 5 to FIG. 8A and FIG. 8B are performed.

An embodiment of this application provides a computer readable storage medium, configured to store an instruction, and when the instruction is executed on a computer, the methods/steps in FIG. 5 to FIG. 8A and FIG. 8B are performed.

All or some of the foregoing embodiments of the present invention may be implemented by using software, hardware, firmware, or any combination thereof. When software is used to implement the embodiments, all or some of the embodiments may be implemented in a form of a computer program product. The computer program product includes one or more computer instructions. When the computer program instructions are loaded and executed on the computer, all or some of the procedures or functions according to the embodiments of the present invention are generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (digital subscriber line, DSL)) or wireless (for example, infrared, radio, or microwave) manner. The computer-readable storage medium may be any usable medium accessible by a computer, or may be a data storage device, such as a server or a data center, integrating one or more usable media. The usable medium may be a magnetic medium (for example, a floppy disk, a hard disk, or a magnetic tape), an optical medium (for example, DVD), a semiconductor medium (for example, a solid state disk), or the like.

The foregoing descriptions are only examples of specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A session establishment method, comprising:
sending, by a terminal, a first message to an access and mobility management function (AMF) entity, wherein the first message comprises first network slice selection information, second network slice selection information, and information for requesting to establish a protocol data unit (PDU) session, wherein the first network slice selection information is used for selection of a session management control function (SMF) entity in a visited public land mobile network (VPLMN), and wherein the second network slice selection information is used for selection of a SMF entity in a home public land mobile network (HPLMN); and
receiving, by the terminal, a second message from the AMF entity, wherein the second message comprises PDU session establishment accept information.

2. The method according to claim 1, wherein the first network slice selection information comprises single network slice selection assistance information (S-NSSAI) in the VPLMN.

3. The method according to claim 2, wherein the S-NSSAI in the VPLMN corresponds to an application.

4. The method according to claim 3, wherein the second network slice selection information comprises S-NSSAI in the HPLMN.

5. The method according to claim 4, wherein the S-NSSAI in the HPLMN corresponds to the application.

6. The method according to claim 1, wherein the second network slice selection information comprises S-NSSAI in the HPLMN.

7. The method according to claim 1, wherein the first message further comprises indication information, and wherein the indication information indicating that the first network slice selection information comprises S-NSSAI in the VPLMN.

8. A terminal, comprising:
a transmitter configured to send a first message to an access and mobility management function (AMF)

entity, wherein the first message comprises first network slice selection information, second network slice selection information, and information for requesting to establish a protocol data unit (PDU) session, wherein the first network slice selection information is used for selection of a session management control function (SMF) entity in a visited public land mobile network (VPLMN), and wherein the second network slice selection information is used for selection of a SMF entity in a home public land mobile network (HPLMN); and a receiver coupled to the transmitter and configured to receive a second message from the AMF entity, wherein the second message comprises PDU session establishment accept information.

9. The terminal according to claim 8, wherein the first network slice selection information comprises single network slice selection assistance information (S-NSSAI) in the VPLMN.

10. The terminal according to claim 9, wherein the S-NSSAI in the VPLMN corresponds to an application.

11. The terminal according to claim 10, wherein the second network slice selection information comprises S-NSSAI in the HPLMN.

12. The terminal according to claim 11, wherein the S-NSSAI in the HPLMN corresponds to the application.

13. The terminal according to claim 8, wherein the second network slice selection information comprises S-NSSAI in the HPLMN.

14. The terminal according to claim 8, wherein the first message further comprises indication information, and the indication information indicating that the first network slice selection information comprises S-NSSAI in the VPLMN.

15. A non-transitory computer-readable medium storing computer instructions for execution by one or more processors, wherein the computer instructions instruct the one or more processors to perform operations comprising:

sending a first message to an access and mobility management function (AMF) entity, wherein the first message comprises first network slice selection information, second network slice selection information, and information for requesting to establish a protocol data unit (PDU) session, wherein the first network slice selection information is used for selection of a session management control function (SMF) entity in a visited public land mobile network (VPLMN), and wherein the second network slice selection information is used for selection of a SMF entity in a home public land mobile network (HPLMN); and receiving a second message from the AMF entity, wherein the second message comprises PDU session establishment accept information.

16. The non-transitory computer-readable medium according to claim 15, wherein the first network slice selection information comprises single network slice selection assistance information (S-NSSAI) in the VPLMN.

17. The non-transitory computer-readable medium according to claim 16, wherein the S-NSSAI in the VPLMN corresponds to an application.

18. The non-transitory computer-readable medium according to claim 17, wherein the second network slice selection information comprises S-NSSAI in the HPLMN.

19. The non-transitory computer-readable medium according to claim 18, wherein the S-NSSAI in the HPLMN corresponds to the application.

20. The non-transitory computer-readable medium according to claim 15, wherein the first message further comprises indication information, and wherein the indication information indicating that the first network slice selection information comprises S-NSSAI in the VPLMN.

* * * * *